(12) United States Patent
Stone

(10) Patent No.: US 8,366,820 B2
(45) Date of Patent: Feb. 5, 2013

(54) CURABLE COMPOSITION, PASTE, AND OXIDATIVELY CARBONATED COMPOSITION

(75) Inventor: David Stone, Twisp, WA (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 133 days.

(21) Appl. No.: 12/376,791

(22) PCT Filed: Apr. 20, 2007

(86) PCT No.: PCT/US2007/067118
§ 371 (c)(1),
(2), (4) Date: Jul. 20, 2009

(87) PCT Pub. No.: WO2008/021591
PCT Pub. Date: Feb. 21, 2008

(65) Prior Publication Data
US 2010/0154675 A1  Jun. 24, 2010

Related U.S. Application Data

(60) Provisional application No. 60/836,274, filed on Aug. 8, 2006, provisional application No. 60/849,249, filed on Oct. 4, 2006.

(51) Int. Cl.
*C09C 1/62* (2006.01)
(52) U.S. Cl. .................. 106/403; 106/286.3; 106/287.18
(58) Field of Classification Search ............... 106/286.3, 106/287.18
See application file for complete search history.

(56) References Cited

U.S. PATENT DOCUMENTS
6,024,791 A  2/2000  Sonoda et al.

FOREIGN PATENT DOCUMENTS
| JP | 509565 | 7/1980 |
| JP | 55095655 A * | 7/1980 |
| RU | 1728174 | 4/1998 |
| SU | 1728174 A1 * | 4/1992 |

* cited by examiner

*Primary Examiner* — Melvin C Mayes
*Assistant Examiner* — Ross J Christie
(74) *Attorney, Agent, or Firm* — Oblon, Spivak, McClelland, Maier & Neustadt, L.L.P.

(57) ABSTRACT

An oxidatively carbonatable composition, a paste for forming an oxidatively carbonated composition, an oxidatively carbonated composition, methods of making an oxidatively carbonated composition, and articles formed from an oxidatively carbonated composition.

28 Claims, 21 Drawing Sheets

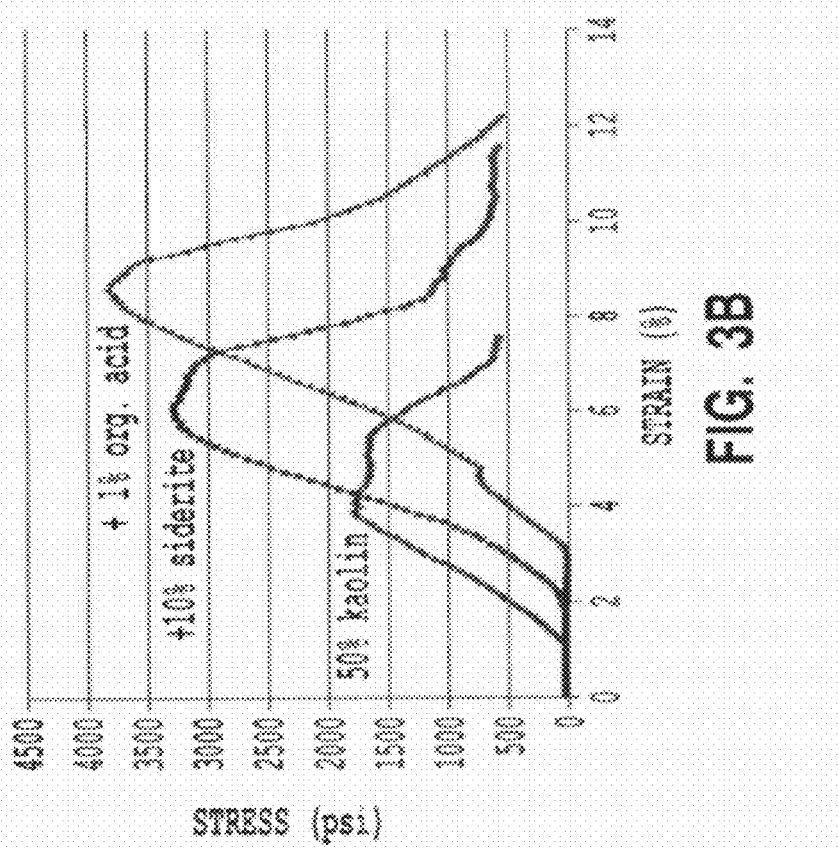
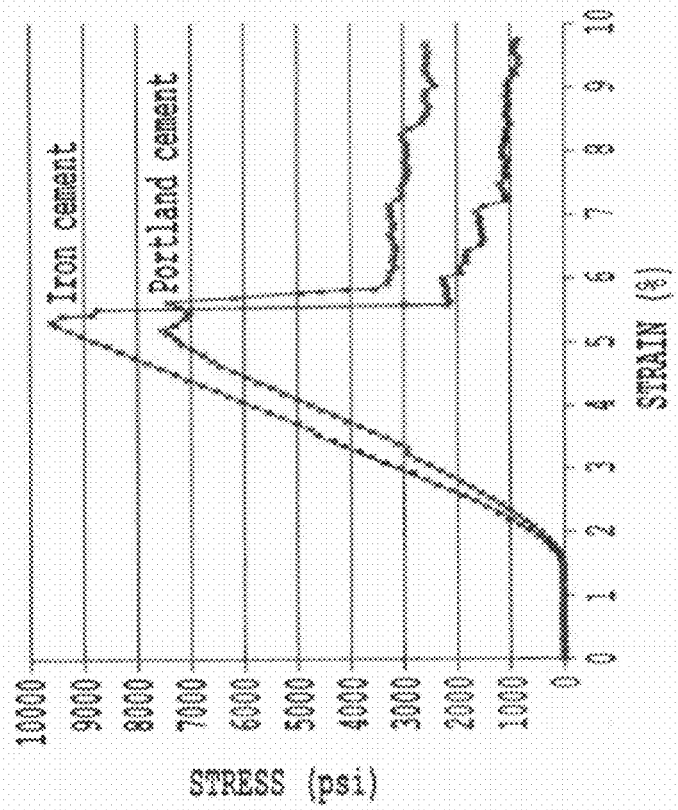
FIG. 3A
FIG. 3B

SEM Images Of Internal Structure

Iron Particles In FeCO₃ Matrix
x 150

Amorphous Material
x 2,000

Goethite Crystals
x 500

Siderite Crystals
x 1000

Iron Silicate? Film
x 2,500

Siderite Growing In Film
x 5,000

CURABLE COMPOSITION, PASTE, AND OXIDATIVELY CARBONATED COMPOSITION

CROSS REFERENCES TO RELATED APPLICATIONS

This application claims priority to U.S. provisional application No. 60/836,274, filed on Aug. 8, 2006, and to U.S. provisional application No. 60/849,249, filed on Oct. 4, 2006, both of which are incorporated herein by reference in their entireties.

STATEMENT REGARDING FEDERALLY SPONSORED RESEARCH

This research was supported by Grant 2 P42 ES04940-11 from the National Institute of Environmental Health Sciences Superfund Basic Research Program, NIH.

BACKGROUND OF THE INVENTION

1. Field of the Invention

The present invention relates to an oxidatively carbonatable composition, a oxidatively carbonatable paste, a method of using an oxidatively carbonatable composition, an oxidatively carbonated composition, a method of making an oxidatively carbonated composition, and an article formed from the oxidatively carbonated composition.

2. Discussion of the Background

Mixing fine iron powder particles with water and chloride salts forms a paste that corrodes when exposed to air. On the surface of the paste, the oxidative process oxidizes the iron to form an orange and brown coating commonly known as rust.

Deeper within the paste, away from the surface, oxygen is more limited. Because of the limited oxygen deep within the paste, metallic iron atoms lose both three and two electrons to form ferric and ferrous ions, respectively. This combination of different iron ions with different charges, known as a mixed valence, forms, with oxygen, $Fe^{2+}{}_1 Fe^{3+}{}_2 O_4$ or $Fe_3 O_4$, found in nature as the mineral magnetite.

In magnetite, the oxygen atoms are shared between the ferric and ferrous ions by bridging. The magnetite forms a hard, continuous, inter-bonded matrix and the iron particles become effectively cemented together, thus forming one kind of iron cement.

The process of making the above-described iron cement has been known for over a century, and the magnetite iron cement resulting from the process is very strong.

Attesting to the strength of the cement, in 1885, the trade journal *The Manufacturer and Builder* reported that a mixture of iron filings, chloride salts, and water produced a cemented joint between two pipe flanges so strong that when bent and broken apart the next day, one of the cast iron flanges failed before the newly formed cement joint split.

However, the above described form of iron cement has drawbacks. Using such a large amount of iron to form a cement is expensive. Additionally, the mixing of such a paste on a large scale can be difficult.

Thus, while iron cements are useful, a need exists for an improved composition that employs less iron than the iron cement that forms magnetite, is more workable in the paste form on large scale, is less expensive to make, and can form a strong inter-bonded matrix. This composition is also important for its ability to permanently trap $CO_2$, utilize industrial waste products, and sequester toxic contaminants such as arsenic and heavy metals like lead.

SUMMARY OF THE INVENTION

It is one object of the present invention to provide an oxidatively carbonatable composition.

It is a further object of the invention to provide a method for making a oxidatively carbonatable composition.

It is a further object of the invention to provide a method of using a oxidatively carbonatable composition.

It is another object of the invention to provide an oxidatively carbonatable paste.

It is a further object of the invention to provide an oxidatively carbonated composition.

Yet another object of the invention is to provide an oxidatively carbonated composition with hardened, cement-like properties.

A further object of the invention is to provide articles made from an oxidatively carbonated composition.

It is another object of the invention to provide methods of making an oxidatively carbonated composition.

Another object of the invention is to provide a method for sequestering carbon dioxide, taken from the atmosphere, into an oxidatively carbonated composition.

A further object of the invention is to provide a method for sequestering a metal and/or a heavy metal into an oxidatively carbonated composition.

Yet a further object of the invention is to provide a method of sequestering and recycling spent steel abrasive powder into an oxidatively carbonated composition.

These and other objects, which will become apparent during the following detailed description, have been achieved by the inventors' discovery that when iron powder is coated with silica to form a composition, water is added to the composition to form a paste, and an oxygenated carbon is allowed to alter the paste to become an oxidatively carbonated composition, the iron in the paste does not form magnetite based iron cement (i.e, it does not predominantly combine with oxygen), but rather, the iron in the paste is carbonated, resulting in formation of a siderite ($FeCO_3$) based oxidatively carbonated composition.

BRIEF DESCRIPTION OF THE DRAWINGS

A more complete appreciation of the invention and many of the attendant advantages thereof will be readily obtained as the same become better understood by the reference to the following detailed description when considered in connection with the accompanying drawings, wherein:

FIG. 3a compares an oxidatively carbonated composition to Portland Cement;

FIG. 3b compares the strength of an oxidatively carbonated composition formed from a paste not placed a magnetic field to the strength of an oxidatively carbonated composition formed from a paste placed in a magnetic field;

FIG. 12b shows and EDS of the tung oil coated oxidatively carbonated composition of FIG. 12a.

DETAILED DESCRIPTION OF THE PREFERRED EMBODIMENTS

Figure 1:
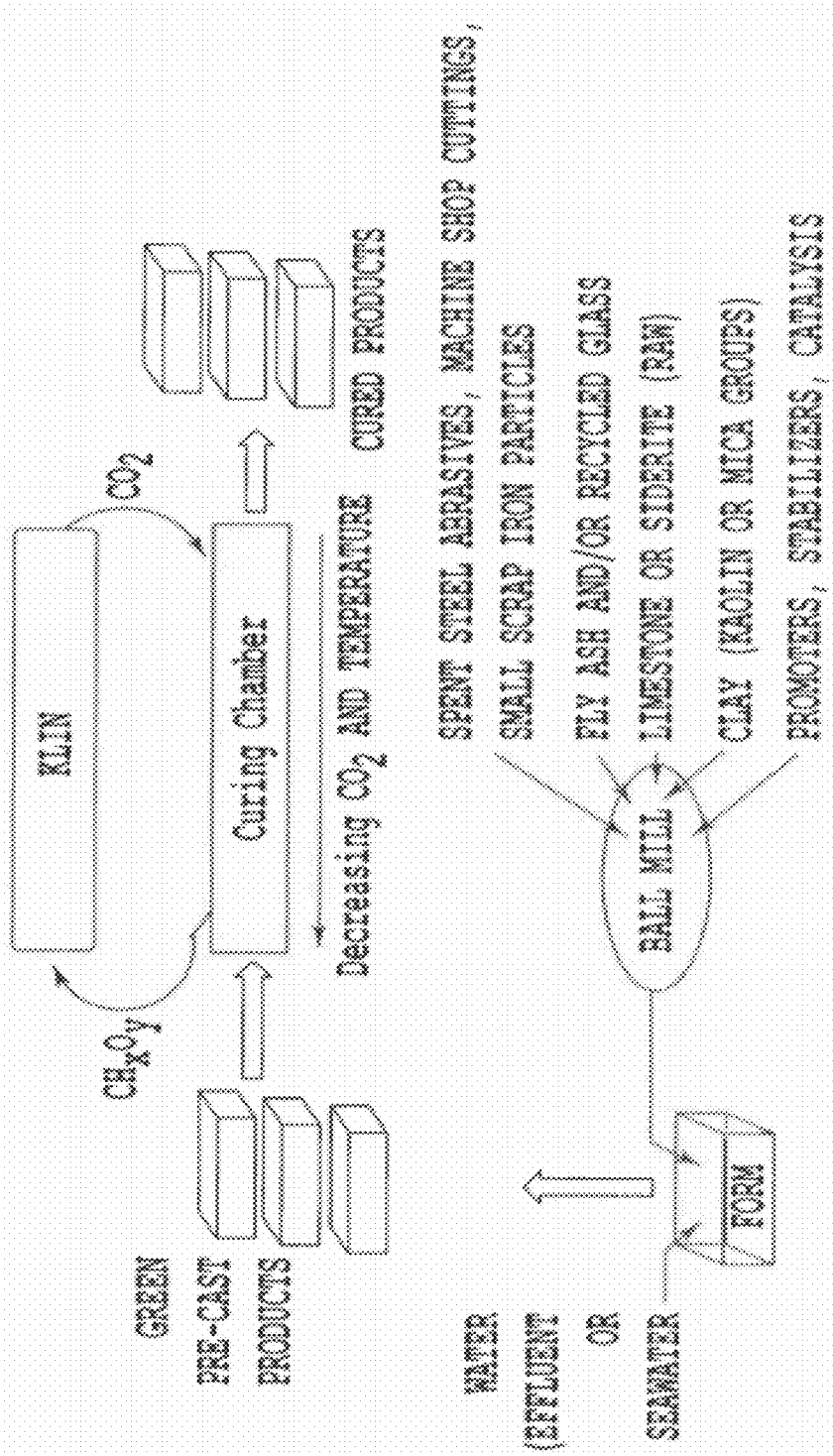
FIG. 1 is a schematic illustration of production of an oxidatively carbonated composition within a Portland Cement plant.
Figure 2:
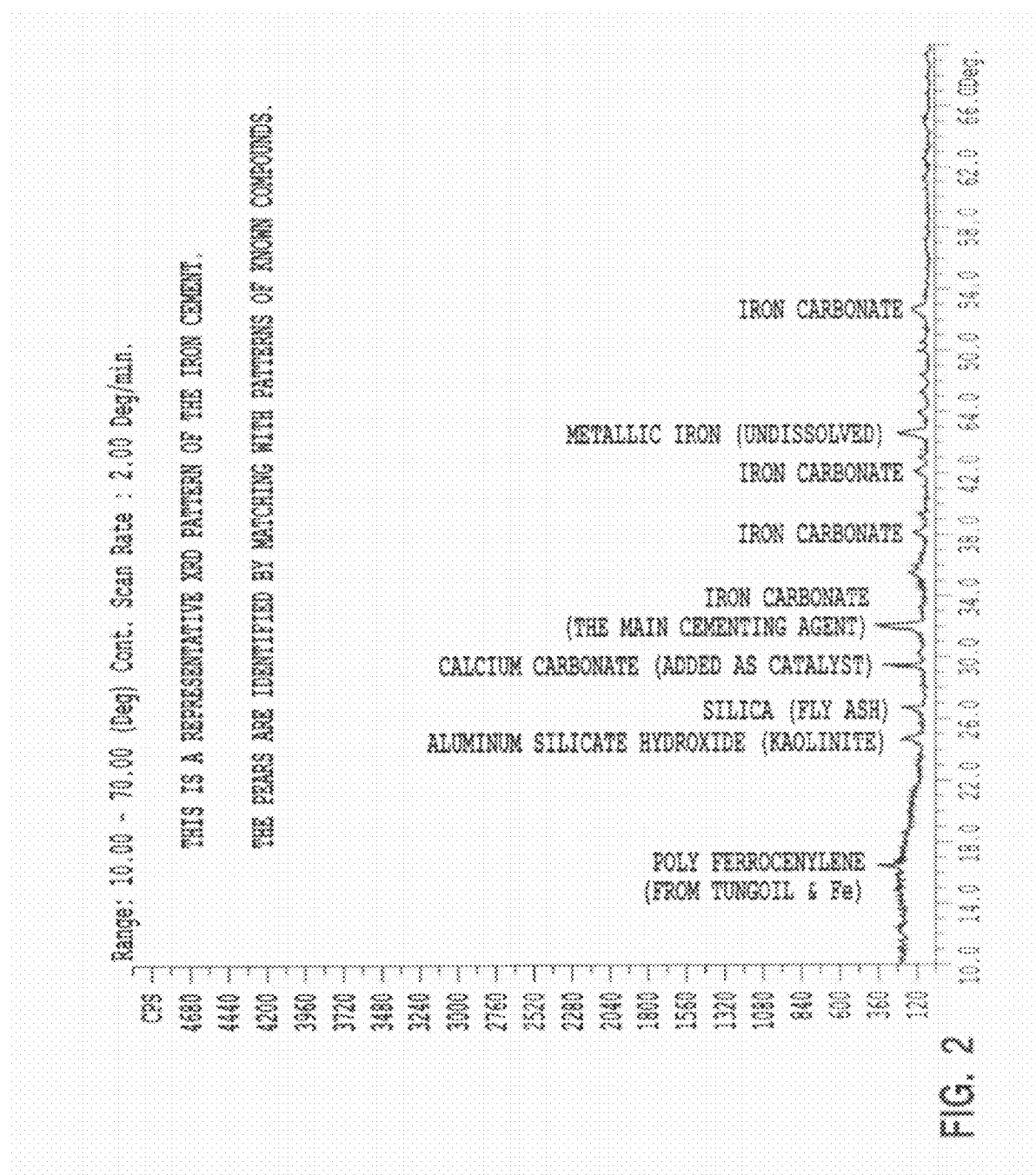
FIG. 2 is an X-ray diffraction pattern of an oxidatively carbonated composition.
Figure 3D:
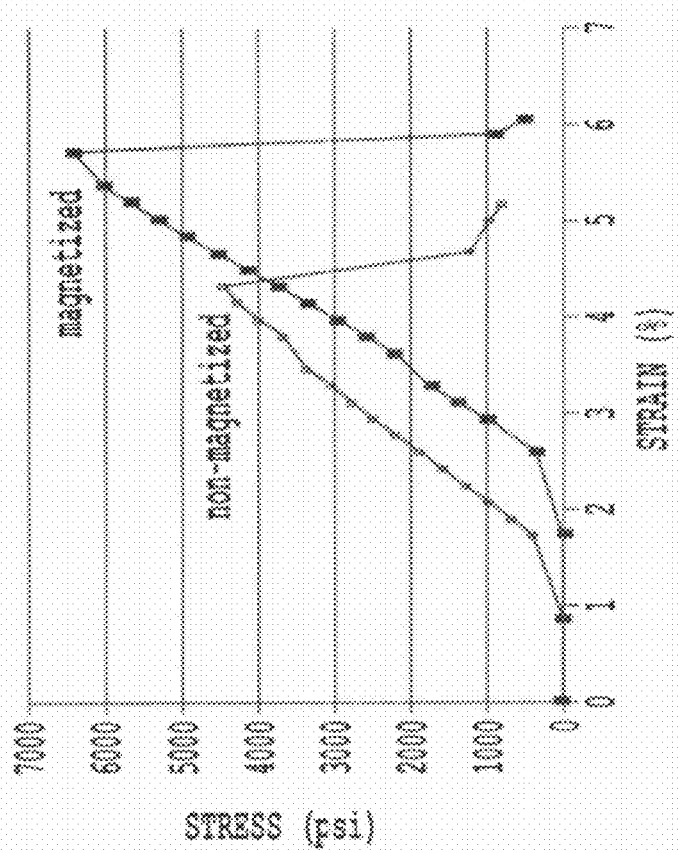
FIG. 3d describes the results of employing different powdered silica sources on the strength of an oxidatively carbonated composition.
Figure 3C:
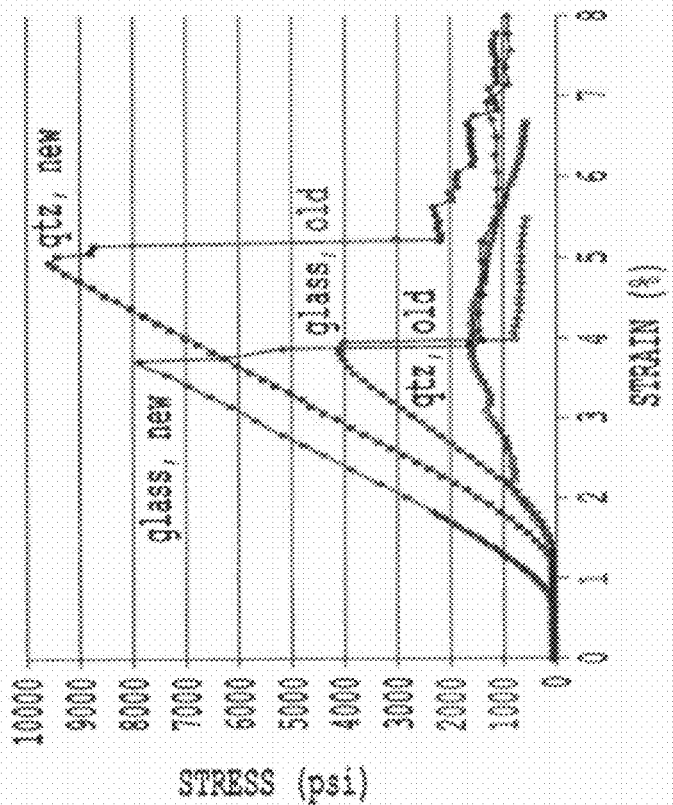
FIG. 3c, describes the effects of different additives on the strength of an oxidatively carbonated composition.
Figure 4A:
FIG. 4 displays images of internal structure components of an oxidatively carbonated composition.
Figure 4B:
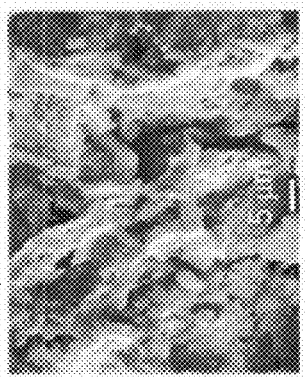
Figure 4C:
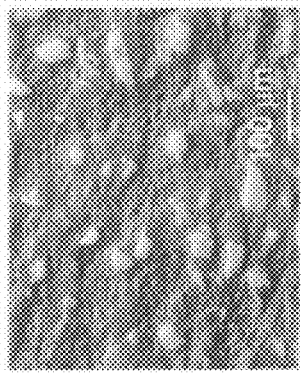
Figure 4D:
Figure 4E:
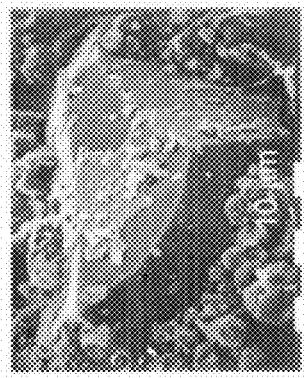
Figure 4F:
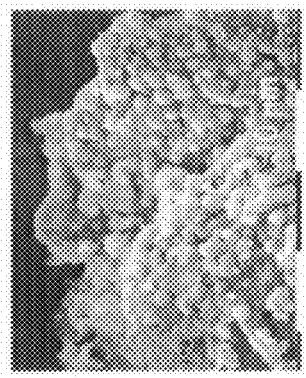

The inventors of the present invention have found that mixing a composition comprising a powdered iron and a powdered silica, with a dissolving compound such as water to form a paste, and transforming the paste with an oxygenated carbon, surprisingly results in a carbonate oxidized composition that has cement-like properties.

Cement-like properties can include, but are not limited to one or more of the following: a strongly inter-bonded matrix, resistance to mechanical stress, resistance to mechanical strain, hardness, and water-repelling properties.

One inventive embodiment is a composition comprising 10-90% by weight of an iron powder and 10-90% by weight of a powdered silica. In the composition, % by weight is based on the total weight of the iron and the silica.

Another inventive embodiment is a composition comprising 20-80% by weight of an iron powder and 20-80% by weight of a powdered silica.

A further inventive embodiment is a composition comprising 30-70% by weight of an iron powder and 30-70% by weight of a powdered silica.

Yet another invention embodiment is a composition comprising 40-60% by weight of an iron powder and 40-60% by weight of a powdered silica.

An additional inventive embodiment is a composition comprising 50% by weight of an iron powder and 50% by weight of a powdered silica.

The composition can further contain an unlimited number of additional ingredients.

It is preferable, in the composition, that the iron powder be mixed with enough powdered silica particles to cover the surface of the iron powder particles and prevent, or greatly reduce, oxidation of the iron particles.

The ratio of the iron powder to the silica powder in the composition can range 1:10 (iron powder:silica powder) to 10:1 (iron powder:silica powder), based on the weight of the iron powder and the silica powder.

Preferably, the ratio of iron powder to silica powder ranges from 3:1-4:1, where the ratio is based on the weight of the iron powder and the silica powder.

In another inventive embodiment, the ratio of the iron powder to the silica powder in the composition can range from 3:2-4:1.

In a further inventive embodiment, the ratio of the iron powder to the silica powder can range from 3:1-3:2.

In a preferred embodiment, the ratio of the iron powder to the silica in the composition is 3:1.

It is preferred that the iron and silica powders of the composition be tightly ground or tightly mixed together, rather than loosely mixed, as subsequent reaction with an oxygenated carbon to form an oxidatively carbonated composition is more effective if there is close contact between the particles.

In general, the powdered iron and silica particles in the composition can have a average particle size distribution of from >0 μm to about 1000 μm or less, with no lower limit placed on the average particle size distribution other than it is not 0 μm. In another inventive embodiment, the iron and silica particles in the composition have an average particle size distribution ranging from >0 μm to 500 μm. In a further inventive embodiment, the iron and silica particles in the composition have an average particle size distribution ranging from >0 μm to 250 μm. In a further inventive embodiment, the iron and silica particles have and average particle size distribution ranging from 0.5 μm to less than or equal to 50 μm.

In a preferred inventive embodiment, the preferred particle size ranges from 10 μm to 100 μm. In this preferred embodiment, particle size is measured by mesh sizing.

For particle sizes below 10 μm, average particle size distribution is measured by laser diffraction.

The particle shape of the iron and silica powdered particles is not limited and can be, for example, spherical, a flake, a whisker, angular, tetrahedral, sub-angular, rounded, and combinations thereof. Preferably, the iron and silica powdered particles have angular shapes, because the angular shapes allow tighter physical packing of the iron and silica powder particles, which, in turn, results in a stronger oxidatively carbonated composition.

An iron powder, for purposes of this application, is a powder comprising at least 50% $Fe^0$. The iron powder can comprise at least 60% $Fe^0$. In another inventive embodiment, the iron powder can comprise at least 70% $Fe^0$. In a further inventive embodiment, the iron powder can comprise at least 80% $Fe^0$. In yet another inventive embodiment, the iron powder can comprise at least 90% $Fe^0$. In a further inventive embodiment, the iron powder can comprise at least 95% $Fe^0$, 96% $Fe^0$, 97% $Fe^0$, 98% $Fe^0$, 99% $Fe^0$, or 100% $Fe^0$. For purposes of this application, % $Fe^0$ is the total percent by weight of the iron powder that is $Fe^0$ based on the total weight of the iron powder.

In a further embodiment, the iron powder does not comprise an ingredient and/or alloy that inhibits oxidation of the iron powder.

In another embodiment, the iron powder does comprises only small amounts of an ingredient and/or alloy that only inhibit a small amount of oxidation of the iron powder.

The materials for forming the iron powder are not particularly limited, and may include, for example, iron powder, steel powder, iron grit, steel grit, spent steel abrasive, steel scrap, steel machine shop waste, and mixtures thereof.

Similarly, the materials for forming the powdered silica are not particularly limited, and may include, for example fly ash, recycled glass, diatomaceous earth, quartz, chalcedony, chert, jasper and mixtures thereof.

The powdered silica may be natural or synthetic. The powdered silica may contain other elements than Si and O, for example, Al, Cu, B, Na, Li, K, Mg, and Ca. The powdered silica may be an alumina based silica. The powdered silica may contain Si—Si and/or O—O bonds and/or O—Si—O bonds. The powdered silica may be an aluminosilicate. The powdered silica may be an amorphous silica. The powdered silica may contain a percentage of Al selected from the group consisting of 1%, 5%, 10%, 15%, 20%, 25%, 30%, 35%, 40%, 45%, and 50%.

The silica may be contain functional groups, such as —OH and/or —$NH_2$ and or OR, where R is an alkyl group of 1-20 carbons, which may be substituted or unsubstituted.

The silica may be primary particles, aggregates of primary particles, precipitated silica, and/or colloidal silica.

Other ingredients may also be present in the composition.

For example, at least one promoter can present in the composition. A promoter can, among other things, aid in dissolving of the iron powder particles when water, and/or another suitable dissolving compound, is added to the composition. The promoters employed are not particularly limited, and can be, for example, an acid, or a salt of the acid The acid can be organic or inorganic. Suitable organic acids, and the salts thereof, include oxalic acid, glycolic acid, citric acid, tartaric acid, formic acid, and acetic acid. Preferably, the promoter is oxalic acid or a salt thereof.

In another aspect of the invention, the promoter can also be a phenol, a hydroxamide, a tetrazole, a triazole, an alcohol, an acetylene, or a beta-diketo compound, all of which may be substituted or unsubstituted.

Also, at least one catalyst may be present the composition. A catalyst acts, among other things, to catalyze the formation of iron carbonate when water and/or another suitable dissolving compound, and an oxygenated carbon, for example carbon dioxide, are added to the composition. Suitable catalysts include calcium carbonate, iron carbonate, calcium-iron carbonate, and calcium-magnesium carbonate.

Further, a formaldehyde absorber can be present in the composition. A formaldehyde absorber acts, among other things, to absorb formaldehyde generated when the composition is transformed to a carbonate oxidized composition. The formaldehyde absorber can be a urea. Preferably, the formaldehyde absorber is solid urea.

A workability improver can also be present in the composition. A workability improver acts, among other things, to improve the ability of the composition, after addition of a dissolving compound, to be shaped and to retain the dissolving compound for as long as necessary. The workability improver can be a clay. The workability improver can also be at least one selected from the group consisting of greenalite, cronstedtite, hisingerite, kaolinite, nacrite, haloysite, muscovite and biotite.

Additionally, at least one stabilizer can be present in the composition. A stabilizer acts, among other things, to accept electrons and/or prevent the formation of hydrogen gas. Magnetite can be the stabilizer.

Finally, an additional metal and/or heavy metal, other than the iron powder, can be present in the composition. Preferably, when the mixture includes an additional metal, that metal is arsenic.

The mixture can also include any combination of a promoter, a catalyst, a formaldehyde absorber, a workability improver, a stabilizer, a metal, and a heavy metal.

Another inventive embodiment is a first paste. The first paste includes the previously described composition and at least one dissolving compound. The dissolving compound can be, for example, water, an alcohol, or an ionic liquid.

One or more dissolving compounds may be present in the first paste. The dissolving compound can comprise from 0 to 25 wt %, based on the total weight of the paste, of the first paste. In a preferred embodiment, the dissolving compound comprises 15 wt % of the first paste.

The water is not particularly limited, and can include any of the following: clean water, storm water runoff, gray water, seawater, salt water, and industrial effluent water.

In another aspect of the invention, the dissolving compound can comprise at least one alcohol. Suitable alcohols include, but are not limited to, methanol, ethanol, n-propanol, n-butanol, n-pentanol, n-hexanol, n-heptanol, n-octanol, and isomers of these compounds. Suitable isomeric alcohols include, but are not limited to, iso-propanol, iso-butanol, sec-butanol, and tert-butanol. The alcohols may also be cyclic. Some non-limiting examples of cyclic alcohols include cyclopropanol, cyclobutanol, cyclopentanol, and cyclohexanol. The alcohols may be substituted and, if appropriate, contain more or more degrees of un-saturation. The alcohols may be di and triols. For example, the alcohols may be ethylene glycol and glycerol.

In another aspect of the invention, the dissolving compound can comprise at least one ionic liquid. Examples of ionic liquids include, but are not limited to:

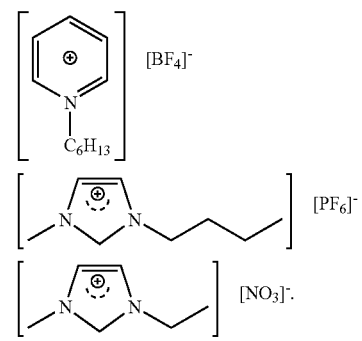

The dissolving compound can also include one or more organic solvents. Examples of solvents include, but are not limited to, acetone, 1-methyl-pyrrolidin-2-one, dimethyl sulfoxide, dimethylsulfone, N,N-dimethylformamide, benzene, and combinations thereof.

Another inventive embodiment is a second paste that includes the above-described first paste and an oxygenated carbon. The oxygenated carbon is one or more of carbonic acid, bicarbonate, a bicarbonate salt, a carbonate salt, carbon dioxide, carbon monoxide, and combinations of these materials. Preferably, the oxygenated carbon is carbonic acid. More preferably, the oxygenated carbon is carbon dioxide.

Yet a further inventive embodiment is a carbonate oxidized composition formed from the second paste. The carbonate oxidized composition comprises mixed particles comprising $Fe^0$ and iron carbonate, and silica particles, and can comprise additional particle types and shapes.

A mixed particle comprises a core and a periphery, such that the core of the mixed particle comprises $Fe^0$, and the periphery of the mixed particle comprises iron carbonate.

Figure 5:
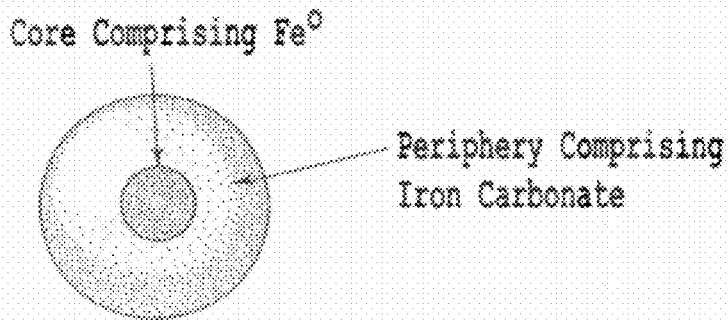
FIG. 5 shows a spherical mixed particle with a core comprising $Fe^0$ and a periphery comprising iron carbonate.

The periphery of the mixed particle does not have a rigidly fixed boundary, and can spread out symmetrically or asymmetrically from the core, depending on the particle. FIG. 5 shows a spherical mixed particle.

Figure 6A:
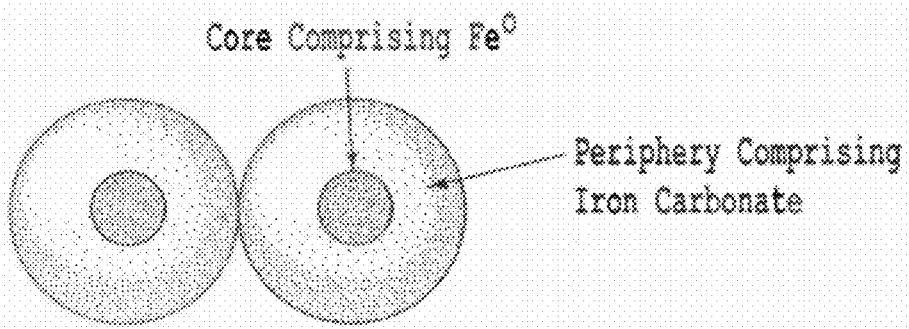
FIG. 6a shows the peripheries of two spherical mixed particles contacting each other.
Figure 6B:
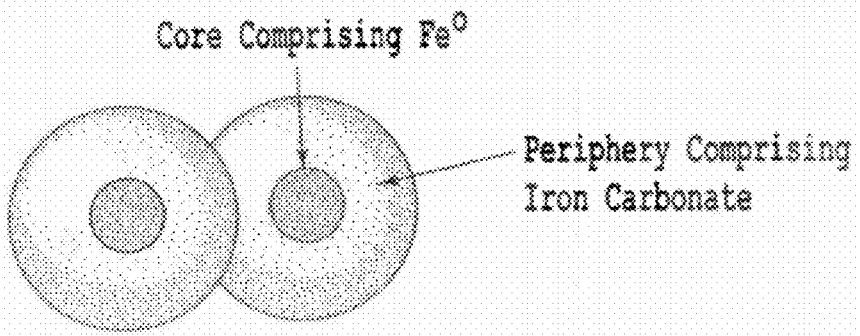
FIG. 6b shows the peripheries of two spherical mixed particles interpenetrating each other.

The peripheries of the mixed particles contact each other, and/or interpenetrate each other, as shown in FIGS. 6a and 6b. The contacting and interpenetrating of the peripheries of mixed particles results in a crystallized and/or interbonded iron carbonate matrix. The oxidatively carbonated composition thus comprises, along with silica particles, a crystallized and/or interbonded matrix of mixed particles.

A further inventive embodiment includes the above-described carbonate oxidized compositions which have been subjected to a secondary cure with an aqueous ammonia solution, and/or sealed with a mineral oil, a tung oil, a waste organic solvent, or a combination of these.

Another inventive embodiment is an article formed from the oxidatively carbonated compositions described above. The article can be formed by, for example, molding, casting, hewing, carving, and combinations of these methods.

The invention also includes a method of forming a composition. In one embodiment, a composition is formed by mixing 10-90% by weight of an iron powder, with 10-90% by weight of a silica powder, to form the composition. In the composition, % by weight is based on the total weight of the iron and the silica.

In another inventive embodiment, a composition is formed by mixing 20-80% by weight of an iron powder, with 20-80% by weight of a silica powder, to form the composition.

In another inventive embodiment, a composition is formed by mixing 30-70% by weight of an iron powder, with 30-70% by weight of a silica powder, to form the composition.

In another inventive embodiment, a composition is formed by mixing 40-60% by weight of an iron powder, with 40-60% by weight of a silica powder, to form the composition.

In another inventive embodiment, a composition is formed by mixing 50% by weight of an iron powder, with 50% by weight of a silica powder, to form the composition For these methods of forming a composition, the composition can further contain an unlimited number of additional ingredients.

Mixing can be accomplished by grinding, and the grinding can be accomplished by using apparati traditionally employed for such purposes. For example, a ball mill can be employed. A mortar and pestle can also be employed.

Yet another inventive embodiment is a method of forming the first paste, comprising mixing the above-described dissolving compound with the above-described composition to form the first paste.

Yet another inventive embodiment is a method of forming the second paste, comprising mixing the above described first paste with the above described oxygenated carbon. In the context of the second paste, mixing can include stirring the oxygenated carbon into the first paste and/or diffusing the oxygenated carbon into the first paste and/or immersing the first paste in an atmosphere comprising 10-100% of the oxygenated carbon when the oxygenated carbon is a gas.

Yet another inventive embodiment is a method of accelerating the curing of the composition by methods in addition to exposure to an atmosphere of the oxygenated carbon (e.g., $CO_2$). These include using carbonated water in mixing the paste or pre-absorbing $CO_2$ gas onto some component(s) of the composition such as the silica powder. This latter method can be made more effective by coating the silica with amine groups, a' common industrial approach to producing a $CO_2$-adsorbent.

A further inventive embodiment is a method of preparing the first paste and/or the second paste for curing comprising subjecting the first and/or the second paste to a magnetic field. The magnetic field strength can range from 0.001 to 1000 Tesla. Preferably, the magnetic field strength ranges from 1 and 100 Tesla. More preferably, the magnetic field strength ranges from 1 and 10 Tesla. Most preferably, the magnetic field strength is 1 Tesla.

In another aspect of the invention, the first and/or the second paste is allowed to stand for at least ten minutes before commencement of any further process steps.

Once the first and/or the second paste is formed, the paste can placed in an atmosphere comprising carbon dioxide to cure the paste and form the cured composition. Placing the paste in an atmosphere comprising carbon dioxide is optional if the dissolving compound is carbonated, contains carbonic acid, at least one bicarbonate salt, or at least one carbonate salt.

In one inventive embodiment, the atmosphere comprises from 10% to 100% carbon dioxide. In a further inventive embodiment, the atmosphere comprises from 50% to 100% carbon dioxide. In another inventive embodiment, the atmosphere comprise about 100% carbon dioxide.

Preferably, the atmosphere comprising carbon dioxide is almost free of oxygen. More preferably, the atmosphere comprising carbon dioxide does not contain oxygen.

Optionally, the first and/or second paste can be heated, without being placed in the atmosphere comprising carbon dioxide and/or while placed in the atmosphere comprising carbon dioxide.

In one inventive embodiment, the first and/or the second paste is heated to a temperature ranging from 20 to 50° C.

Preferably, the first and/or the second paste is allowed to oxidatively carbonate for a period of time ranging from 1 to 7 days. More preferably, the first and/or the second paste is allowed to oxidatively carbonate for 5 to 7 days.

In one inventive embodiment, the term oxidatively carbonated refers to a process whereby at least a portion of the iron particles, present in an iron powder and silica powder composition, when exposed to carbon dioxide gas in the presence of water, dissolve into the water, are oxidized, preferably by carbonic acid present in the water, and precipitate as an iron carbonate to form an oxidatively carbonated composition.

In one inventive embodiment, when the weight of the composition is compared to the weight of the oxidatively carbonated composition, the oxidatively carbonated composition will weigh from 10-25% more than the composition. The 10-25% increase in mass constitutes oxygenated carbon captured in the oxidatively carbonated composition. Preferably, the captured mass refers to the mass of captured carbon dioxide.

In an additional inventive embodiment, the first and/or the second paste, if showing signs of prematurely drying while curing in the atmosphere comprising carbon dioxide, has additional dissolving compound added. Premature drying can be evidenced, for example, by spots or areas of dryness visually appearing while the second paste is oxidatively carbonating, relative to the surrounding areas of the paste. Dissolving compound can be added, for example, by spraying, pouring, and/or brushing on additional dissolving compound.

Preferably, the additional added dissolving compound is water.

Once the oxidatively carbonated composition is formed, a finish cure can optionally be applied to the oxidatively carbonated composition. In one embodiment, to effect the finish cure, the at least partially oxidatively carbonated composition is saturated with an ammonia solution and covered tightly with a material that is almost impermeable or completely impermeable to water and ammonia. In one embodiment, the material is a plastic material such as a polyethylene film.

In another embodiment of the invention, the ammonia solution is an aqueous ammonia solution comprising from 10 to 15%, by weight of the solution, of the ammonia.

The finish cure is conducted for a period of time of at least one day. Preferably, the finish cure is conducted from 1 to 30 days. The finish curing can be conducted with heating, and the temperature of the heat can range from 20 to 70° C.

In another embodiment of the invention, the oxidatively carbonated composition, optionally after being dried and having been finish cured by the ammonia, can be saturated with a tung oil/mineral spirit mix to seal the cured composition and protect the cured product from oxidation. An oil, a solvent, or an organic waste can also be applied, separately or in combination, to seal the cured composition.

Without being bound by theory, the present inventors discovered that when an iron powder was mixed with silica and water to form a first paste, reaction of the iron with oxygen is inhibited (e.g., oxidation of the iron by air is inhibited), presumably because the silica coats or blocks the surface of the iron and prevents the oxidation. However, when the oxygenated carbon, preferably carbon dioxide, is added to the first paste, the iron powder undergoes a series of reactions, over time, to form a carbonate oxidized composition.

The composition is thought to form in a series of steps, shown below with the use of carbon dioxide.

First, carbon dioxide and water react, producing the proton source carbonic acid (equation 1):

$$H_2O + CO_2 \rightarrow HOC(O)OH \quad (1).$$

The carbonic acid solution is then thought to dissolve some of the iron into the solution.

An oxidation reaction of metallic iron in the presence of carbon dioxide and water is thought to occur (equation 2):

$$Fe^0 + CO_2 + H_2O \rightarrow Fe^{2+} + HCO_3^- + H^+ + 2e^- \quad (2)$$

The bicarbonate ion ($HCO_3^-$) is then believed to react with $Fe^{2+}$ to form siderite, which precipitates, thus forming the oxidatively carbonated composition.

Side reactions can also occur.

As reaction with carbon dioxide progresses, hydrogen gas can be evolved, as shown in equation (3):

$$2H_2O + 2e- \rightarrow H_2 + 2OH^- \quad (3)$$

The evolution of hydrogen is detrimental because it can cause blistering of the surface of the oxidatively carbonated composition and porosity within the oxidatively carbonated composition. This problem can be ameliorated by a slower, stepwise setting process in air to stabilize the first paste prior to initiating reaction with carbon dioxide. The stepwise setting process can include cool/wet, cool/dry, and hot/dry stages.

Another mineral which can be oxidatively formed during the oxidative carbonation process is carbonate green rust ($Fe^{2+}_4Fe^{3+}_3(OH)_{12}CO_3 \cdot 2H_2O$). Carbonate green rust can then transform, by oxidation, into ferric oxyhydroxy carbonate ($Fe^{3+}_6O_{(2+x)}(OH)_{(12-x)} \cdot (H_2O)_x(CO_3)$), where x is an integer greater than or equal to 0.

Thus, to maximize the formation of siderite, and minimize the formation of other iron containing oxidative by-products, the total oxygen present in the carbon dioxide atmosphere should be minimized, and ideally, eliminated.

Samples of the cured material can be analyzed using scanning electron microscopy (SEM) combined with energy dispersive spectroscopy (EDS). The combination can clearly identify the unique characteristics of the material. Using SEM images at various magnifications and EDS elemental analysis at points and within areas can reveal the raw materials comprising the cured product and the processes of transformation that they have undergone. The EDS analysis results are in the form of relative signal peaks plotted on a graph as well as quantitative elemental analysis tables.

Figure 7A:
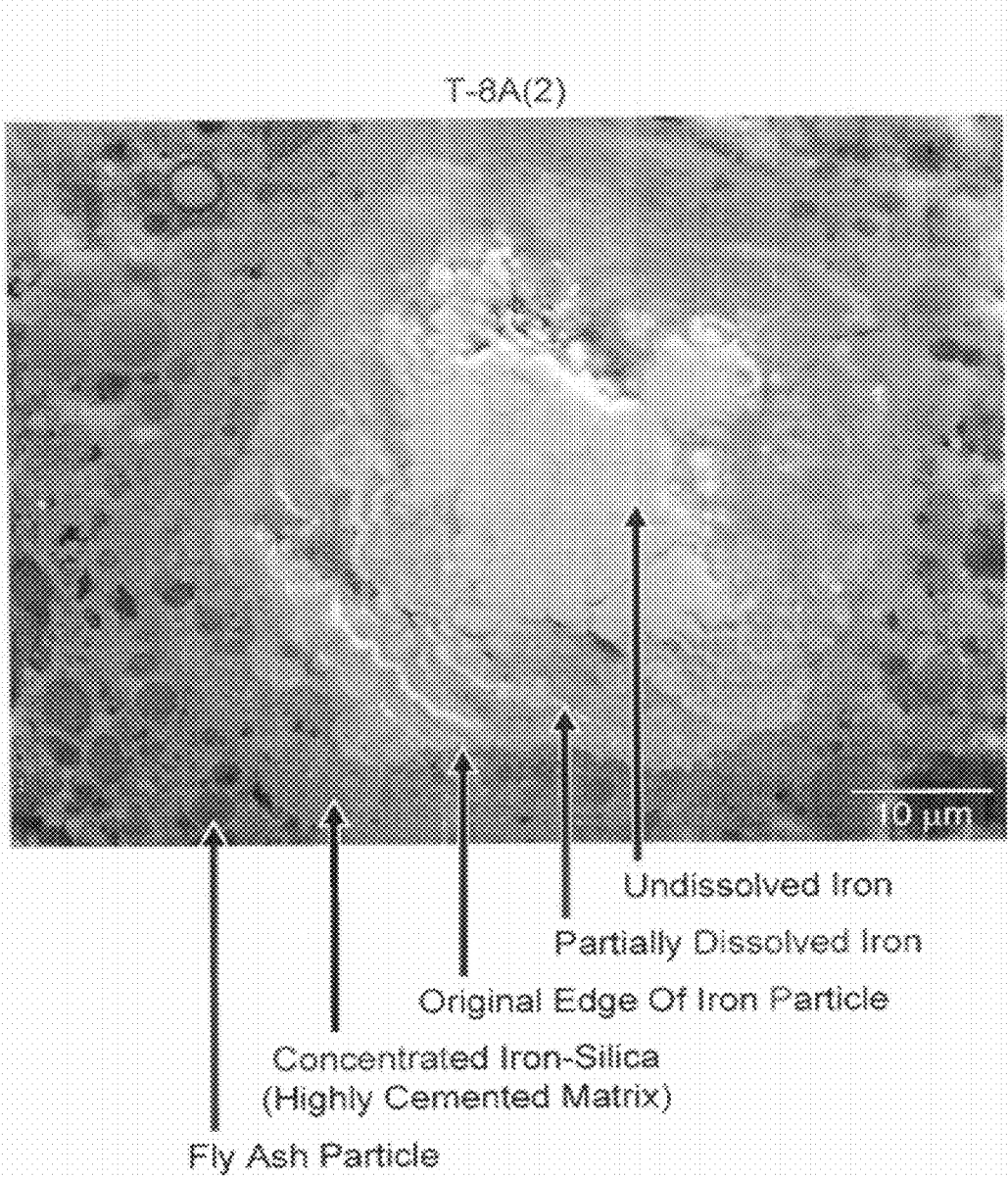
FIG. 7a shows a scanning electron microscopy (SEM) characterization of a section of an oxidatively carbonated composition which contains an iron particle having an $Fe^0$ core and an iron carbonate ($FeCO_3$) periphery.

In FIG. 7a, a partially dissolved iron particle is depicted at 1500× magnification. This particle exemplifies the range of dissolution typical within the cured product from solid undissolved iron at the core through layers of partial dissolution to an outer shell of highly dense and concentrated iron carbonate, which is the a cementing agent.

Figure 7B:
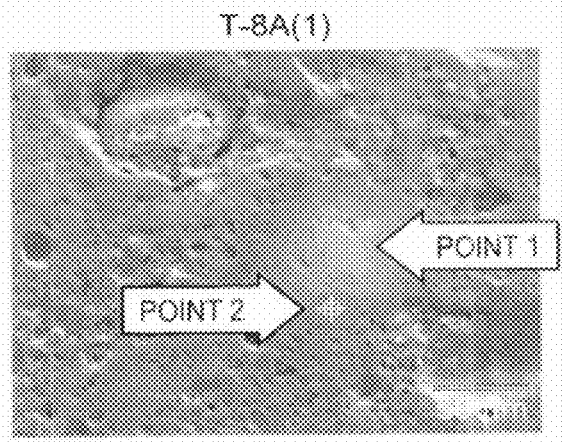
FIG. 7b shows a energy dispersion x-ray spectroscopy (EDS) characterization of an oxidatively carbonated composition which contains an iron particle having an $Fe^0$ core and an iron carbonate ($FeCO_3$) periphery
Figure 7B:
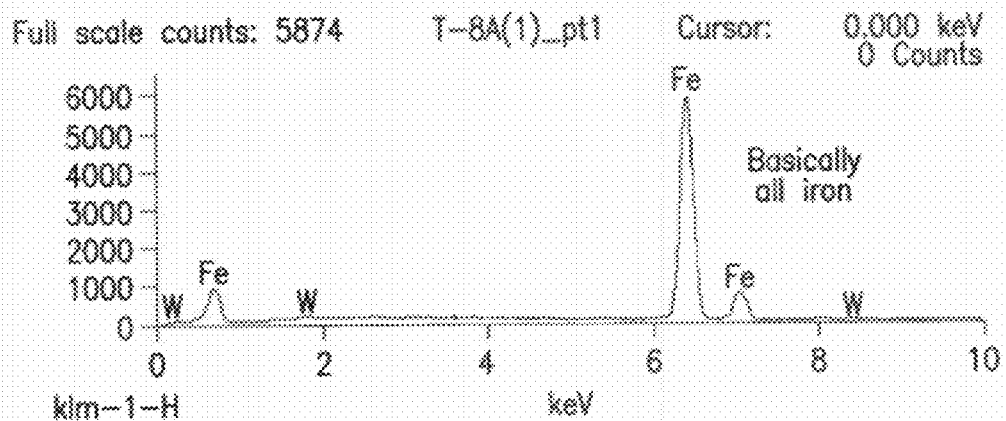
Figure 7B:
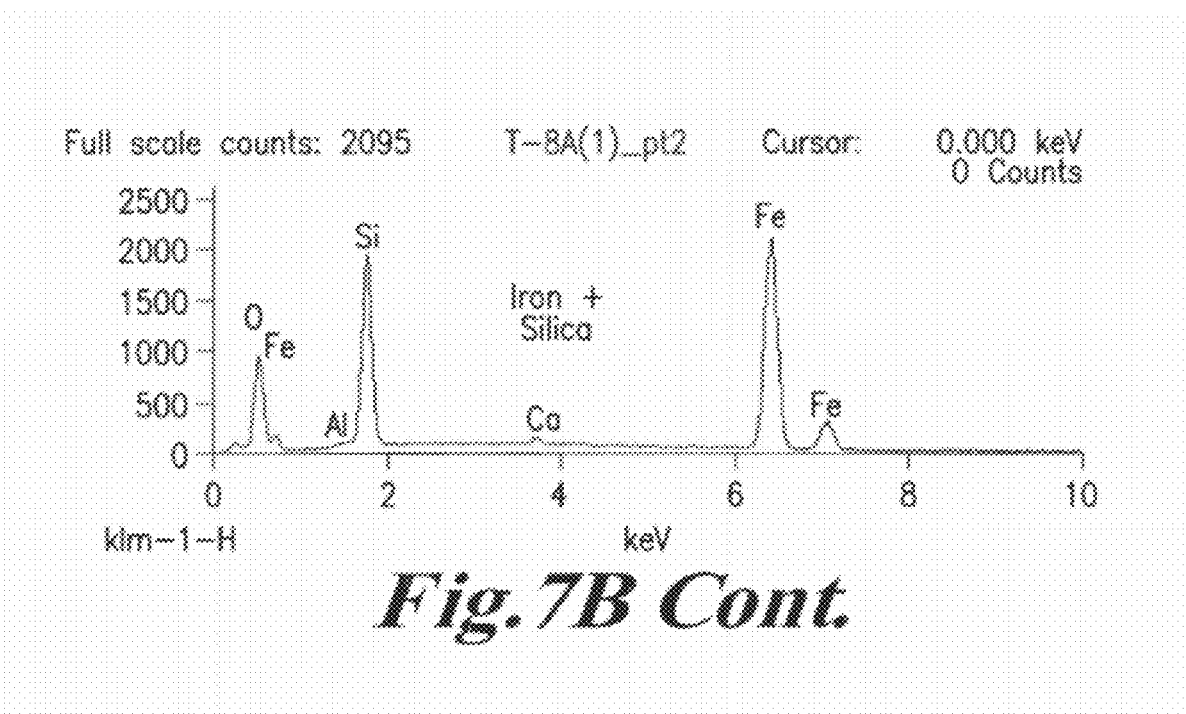

In FIG. 7b, two points of EDS analysis make this quantitatively clear. At point 1, the analysis reveals that the material is almost pure iron. At point 2, which is out amongst the interparticle aggregate, there is also silica as expected but still high concentrations of iron. This iron has dissolved off of the particle and has precipitated as iron carbonate within the interstitial space around the silica particles, which are here in the form of fly ash. (Note that it is the element silicon that is picked up by the EDS, not the silica molecule.) The silica is expected but the amount of iron still present beyond the original boundary of the iron particle from which it is derived is noteworthy. A quantitative breakdown of the elements present in the cement of FIG. 7b is tabulated below.

TABLE 1

Quantitative Elemental Analysis for Point 1 of FIG. 7 (b):

| Element Line | Net Counts | Element Wt. % | Wt. % Error | Compnd Formula | Compnd Wt. % |
|---|---|---|---|---|---|
| Fe K | 116906 | 98.42 | +/−0.54 | Fe | 98.42 |
| Fe L | 12487 | — | — | | — |
| W L | 604 | 1.58 | +/−0.31 | W | 1.58 |
| W M | 1619 | — | — | | |
| Total | | 100 | | | 100 |

Point 1: basically all iron
Filter Fit Chi-squared value: 2.618
Correction Method: Proza (Phi-Rho-Z)
Acc. Voltage: 25.0 kV
Take Off Angle: 30.0 deg

TABLE 2

Quantitative Elemental Analysis for Point 2 of FIG. 7 (b):

| Element Line | Net Counts | Element Wt. % | Wt. % Error | Compnd Formula | Compnd Wt. % |
|---|---|---|---|---|---|
| O K | 10090 | 46.11 | +/−0.68 | O | 46.11 |
| Al K | 252 | 0.26 | +/−0.06 | Al | 0.26 |
| Si K | 22769 | 16.49 | +/−0.15 | Si | 16.49 |
| Ca K | 824 | 0.49 | +/−0.04 | Ca | 0.49 |
| Ca L | 0 | — | — | | — |
| Fe L | 1970 | — | — | | — |
| Fe K | 38287 | 36.65 | +/−0.34 | Fe | 36.65 |
| Total | | 100 | | | 100 |

Correction Method: Proza (Phi-Rho-Z)
Acc. Voltage: 25.0 kV
Take Off Angle: 30.0 deg Table 2 provides the elemental analysis for Point 2 of FIG. 7b. In column 1, the element and the electron shell 'line' are listed. For some elements like calcium (Ca) and iron (Fe) two different lines are recorded from both the K and L shells. In the second column, the 'net counts' are listed, which reflects the intensity of the signal measured for that element. In column 3, the element weight in percent is calculated based on the counts. The values are normalized relative to each other so that the total is 100%. In column 4, the error range is given in weight percent. In column 5, the compound formula is listed, which in these analyses is given as the element only. Oxygen, for instance, may be part of a carbonate, silicate, or oxide. In column 6, the compound weight percent is given, which for the reasons just given is equal to the element weight percent. In some analyses, the atomic weight percent is given, which is different from the element weight percent because it takes into account the differences in the relative atomic weights of the elements. For example, iron is relatively heavy with an atomic weight of 55.85 compared with the atomic weight of carbon, which is 12.01.

Figure 8A:
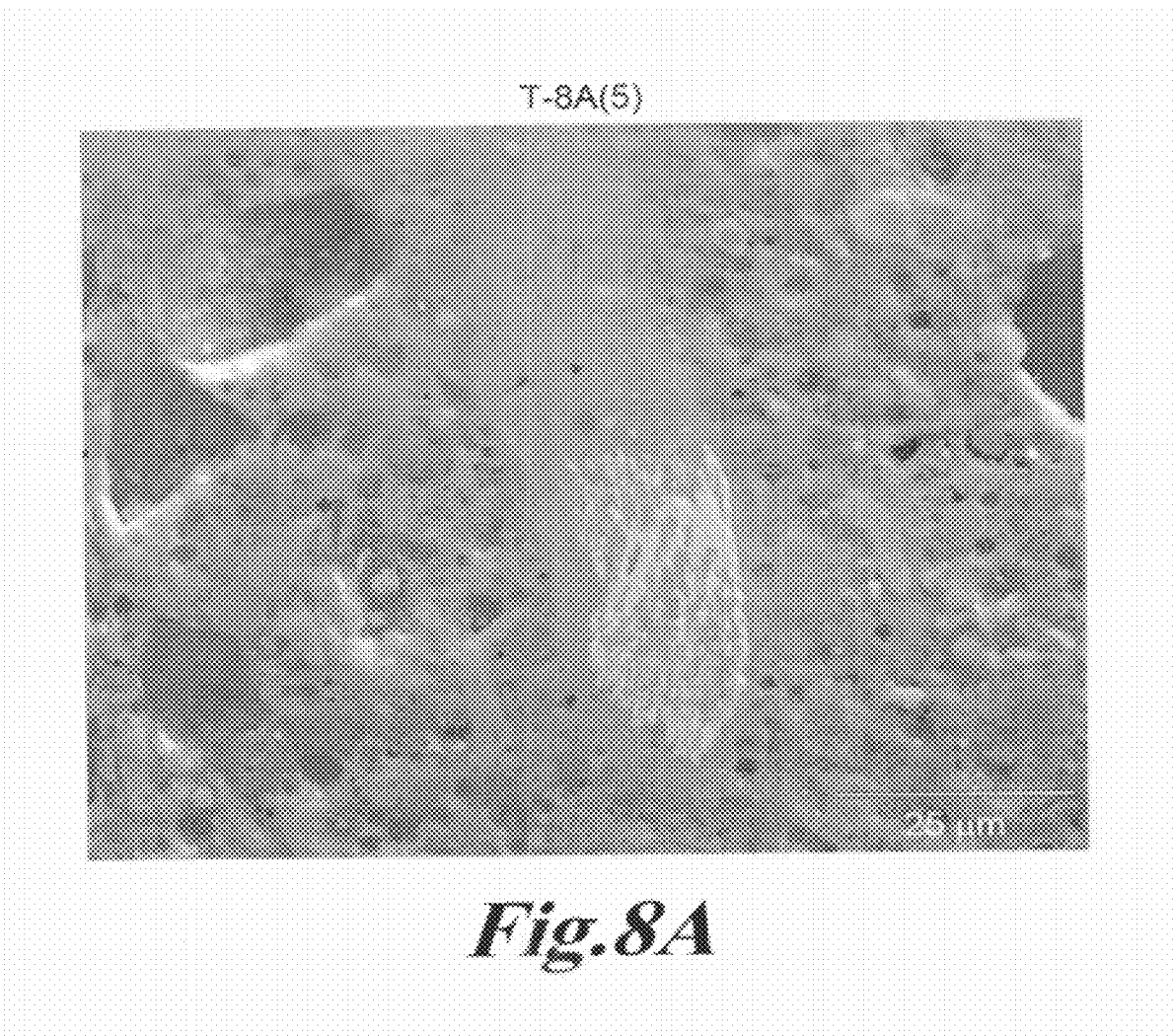
FIG. 8a shows an SEM characterization of a section of an oxidatively carbonated composition.
Figure 8B:
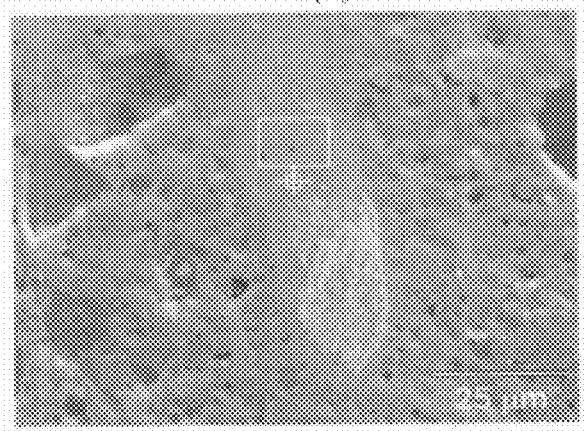
FIG. 8b shoes and EDS characterization of a section of an oxidatively carbonated composition.
Figure 8B:
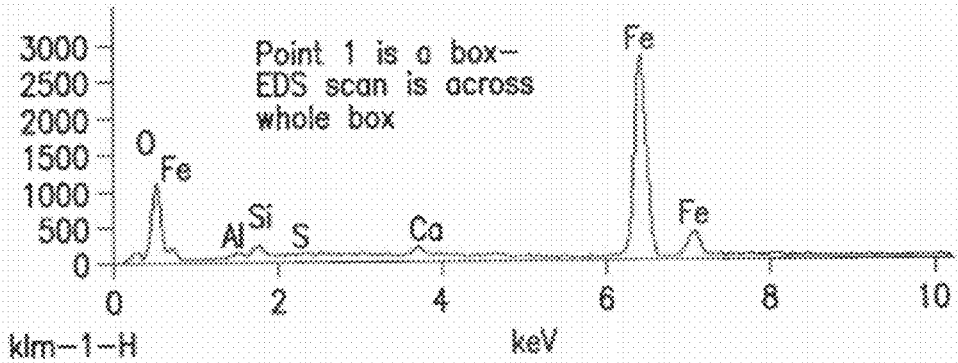
Figure 8B:
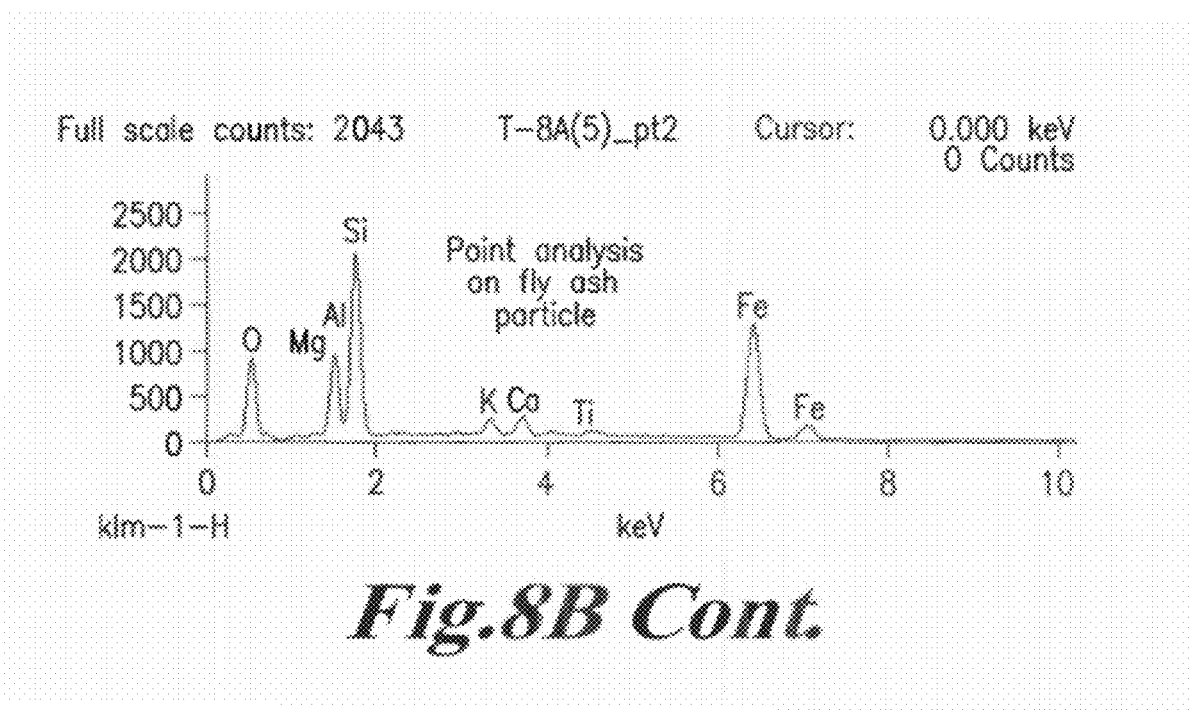

In FIG. 8a, another iron particle is shown at 1000× magnification and though the image may superficially appear different from the one in FIG. 7a, the same processes have been at work. A slightly lighter colored area is seen around and above the light gray, striated particle in the lower center of the image. This area is also somewhat smoother and more densely packed in appearance. This is the area of very high iron concentration as in FIG. 7a. The iron here has dissolved from the iron particle and precipitated around it as iron carbonate. In FIG. 7b, the EDS analysis confirms this. Point 1 is a box within which the average elemental analysis was taken over the entire enclosed area. It shows that iron dominates despite the fact that it is no longer metallic iron but an iron carbonate precipitate. Only in Point 2, which was focused on the center of a solid fly ash particle, can a quantity of silica be found that is higher than iron. This indicates that the iron carbonate concentration is very high in the shell or periphery around the iron particles although it is present dispersed as a gradient throughout the aggregate between iron particles. This is a characteristic feature of the iron cement. A quantitative breakdown of the elements present in the cement of FIG. 8b is tabulated below in Tables 3 and 4.

TABLE 3

Quantitative Elemental Analysis for Point 1 of FIG. 8 (b):

| Element Line | Net Counts | Element Wt. % | Wt. % Error | Compnd Formula | Compnd Wt. % |
|---|---|---|---|---|---|
| O K | 11207 | 44.32 | +/−0.63 | O | 44.32 |
| Al K | 594 | 0.78 | +/−0.14 | Al | 0.78 |
| Si K | 1776 | 1.6 | +/−0.12 | Si | 1.6 |
| S K | 376 | 0.29 | +/−0.05 | S | 0.29 |
| S L | 0 | — | — | | |
| Ca K | 1736 | 1.03 | +/−0.09 | Ca | 1.03 |
| Ca L | 0 | — | — | | |
| Fe L | 2124 | — | — | | |
| Fe K | 52146 | 51.98 | +/−0.41 | Fe | 51.98 |
| Total | | 100 | | | 100 |

POINT 1 (box)
Filter Fit Chi-squared value: 8.749
Correction Method: Proza (Phi-Rho-Z)
Acc. Voltage: 25.0 kV
Take Off Angle: 30.0 deg

TABLE 4

Quantitative Elemental Analysis for Point 2 of FIG. 8 (b):

| Element Line | Net Counts | Element Wt. % | Wt. % Error | Compnd Formula | Compnd Wt. % |
|---|---|---|---|---|---|
| O K | 9537 | 50.1 | +/−0.72 | O | 50.1 |
| Mg K | 232 | 0.27 | +/−0.06 | Mg | 0.27 |
| Al K | 9650 | 7.97 | +/−0.17 | Al | 7.97 |
| Si K | 23874 | 16.24 | +/−0.19 | Si | 16.24 |
| K K | 2357 | 1.3 | +/−0.09 | K | 1.3 |
| K L | 0 | — | — | | |
| Ca L | 0 | — | — | | |
| Ca K | 2834 | 1.62 | +/−0.10 | Ca | 1.62 |
| Ti L | 0 | — | — | | |
| Ti K | 970 | 0.67 | +/−0.09 | Ti | 0.67 |
| Fe K | 23959 | 21.83 | +/−0.27 | Fe | 21.83 |
| Fe L | 941 | — | — | | |
| Total | | 100 | | | 100 |

Figure 9A:
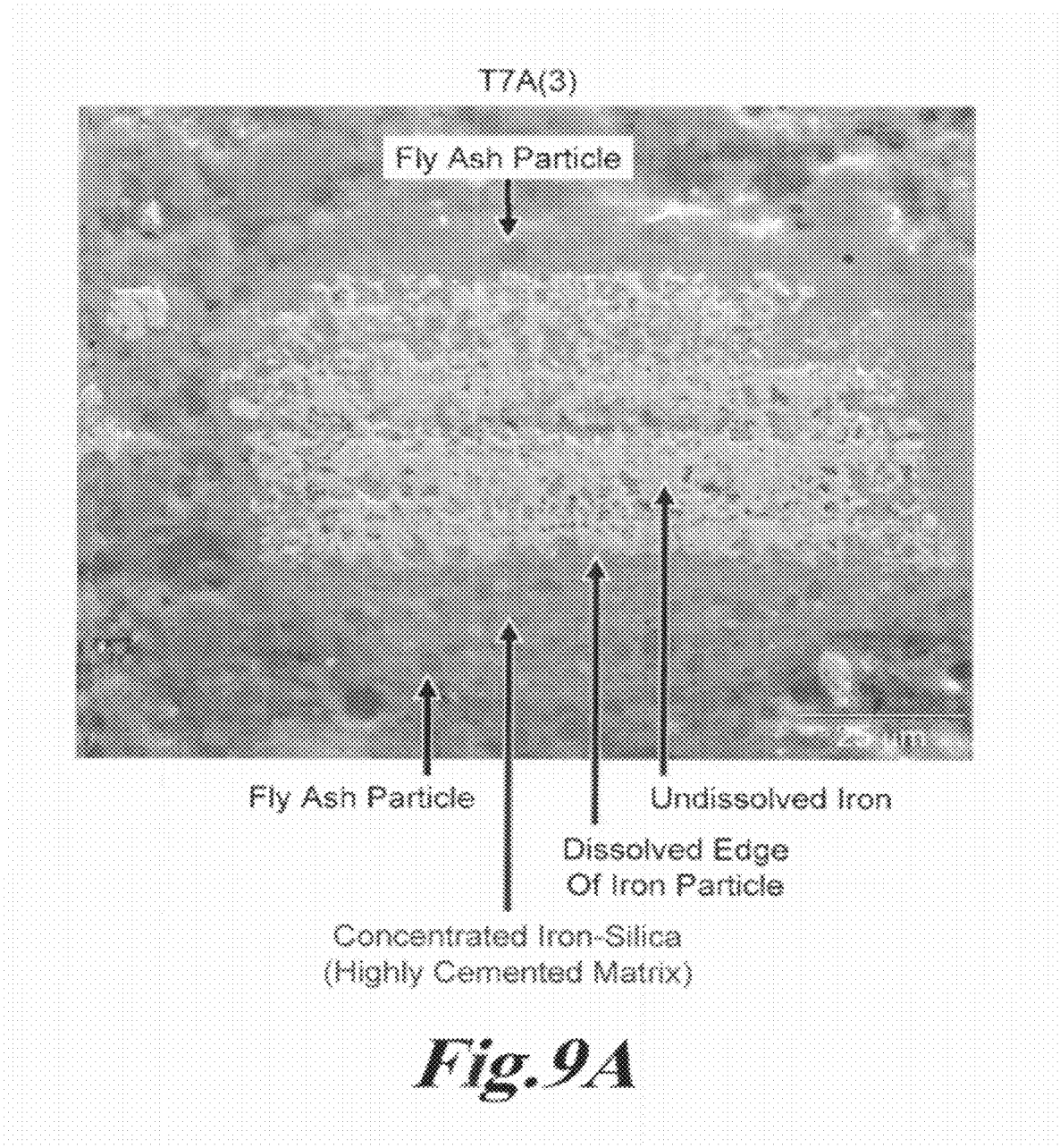
FIG. 9a shows an SEM characterization of a section of an oxidatively carbonated composition.
Figure 9B:
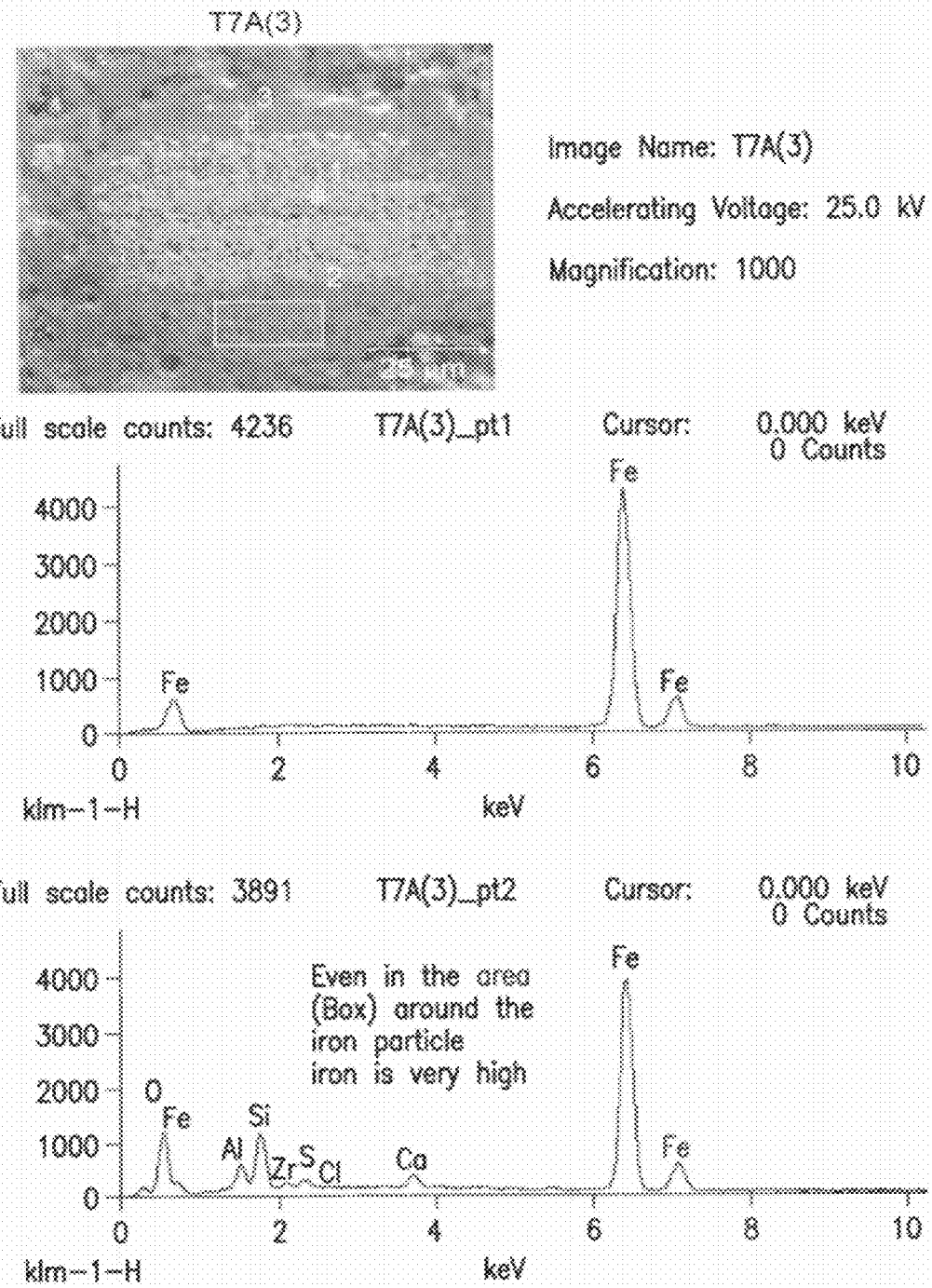
FIG. 9b shows an EDS characterization of a section of an oxidatively carbonated composition.
Figure 9B:
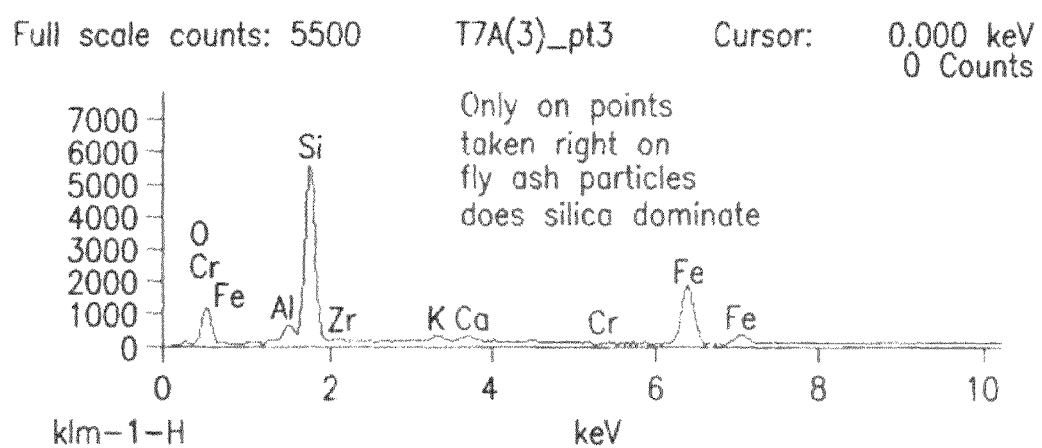

POINT 2
Filter Fit Chi-squared value: 5.293
Correction Method: Proza (Phi-Rho-Z)
Acc. Voltage: 25.0 kV
Take Off Angle: 30.0 deg FIG. 9 is an example of a partially dissolved iron particle with a precipitative shell of iron carbonate. FIG. 9 demonstrates the process of dissolutive oxidative carbonation. The iron particle has a very rough, fragmented surface indicative of dissolution. The interior shows dissolution, leaving a pockmarked, very porous pattern. The EDS scans of FIG. 9b show that the most unaffected areas within the particle are pure iron (Point 1), while the darker gray area beyond the particle is very high in iron despite the fact that fly ash and other non-iron particles are present in the boxed region making up the averaged scan of Point 2. In Point 3, focused on the center of a fly ash particle very close to the iron particle, silicon (from silica) dominates though even here iron has infiltrated. It is this diffusion, precipitation, and infusion of iron throughout the silica-based aggregate that is part of the cementing process. The iron dissolves off the metallic iron particles, oxidizing as it does so from zero-valent iron, Fe(0) or $Fe^0$, to ferrous iron ions, Fe(II) or $Fe^{+2}$.

TABLE 5

Quantitative Elemental Analysis for Point 1 of FIG. 9 (b):

| Element Line | Net Counts | Element Wt. % | Wt. % Error | Compnd Formula | Compnd Wt. % |
|---|---|---|---|---|---|
| Fe K | 88383 | 100 | +/−0.67 | Fe | 100 |
| Fe L | 8137 | — | — | | |
| Total | | 100 | | | 100 |

POINT 1
Filter Fit Chi-squared value: 10.156
Correction Method: Proza (Phi-Rho-Z)
Acc. Voltage: 25.0 kV
Take Off Angle: 30.0 deg

TABLE 6

Quantitative Elemental Analysis for Point 2 of FIG. 9 (b):

| Element Line | Net Counts | Element Wt. % | Wt. % Error | Compnd Formula | Compnd Wt. % |
|---|---|---|---|---|---|
| O K | 12435 | 38.56 | +/−0.43 | O | 38.56 |
| Al K | 5221 | 3.76 | +/−0.19 | Al | 3.76 |
| Si K | 14380 | 7.52 | +/−0.18 | Si | 7.52 |
| S K | 2038 | 1 | +/−0.12 | S | 1 |

TABLE 6-continued

Quantitative Elemental Analysis for Point 2 of FIG. 9 (b):

| Element Line | Net Counts | Element Wt. % | Wt. % Error | Compnd Formula | Compnd Wt. % |
|---|---|---|---|---|---|
| S L | 0 | — | — | — | — |
| Cl L | 185 | — | — | — | — |
| Cl K | 482 | 0.21 | +/−0.04 | Cl | 0.21 |
| Ca K | 4069 | 1.52 | +/−0.09 | Ca | 1.52 |
| Ca L | 0 | — | — | — | — |
| Fe L | 3717 | — | — | — | — |
| Fe K | 76925 | 46.44 | +/−0.33 | Fe | 46.44 |
| Zr M | 0 | — | — | — | — |
| Zr L | 1596 | 1 | +/−0.12 | Zr | 1 |
| Zr K | 89 | — | — | — | — |
| Total | | 100 | | | 100 |

POINT 2
Filter Fit Chi-squared value: 4.743
Correction Method: Proza (Phi-Rho-Z)
Acc. Voltage: 25.0 kV
Take Off Angle: 30.0 deg

TABLE 7

Quantitative Elemental Analysis for Point 3 of FIG. 9 (b):

| Element Line | Net Counts | Element Wt. % | Wt. % Error | Compnd Formula | Compnd Wt. % |
|---|---|---|---|---|---|
| O K | 12879 | 46.9 | +/−0.74 | O | 46.9 |
| Al K | 5697 | 2.82 | +/−0.07 | Al | 2.82 |
| Si K | 73346 | 27.75 | +/−0.18 | Si | 27.75 |
| K L | 0 | — | — | — | — |
| K K | 2269 | 0.84 | +/−0.04 | K | 0.84 |
| Ca K | 2517 | 0.95 | +/−0.04 | Ca | 0.95 |
| Ca L | 0 | — | — | — | — |
| Cr K | 335 | 0.15 | +/−0.04 | Cr | 0.15 |
| Cr L | 0 | — | — | — | — |
| Fe K | 33621 | 19.69 | +/−0.22 | Fe | 19.69 |
| Fe L | 972 | — | — | — | — |
| Zr M | 31 | — | — | — | — |
| Zr L | 1363 | 0.9 | +/−0.10 | Zr | 0.9 |
| Zr K | 2 | — | — | — | — |
| Total | | 100 | | | 100 |

Figure 10:
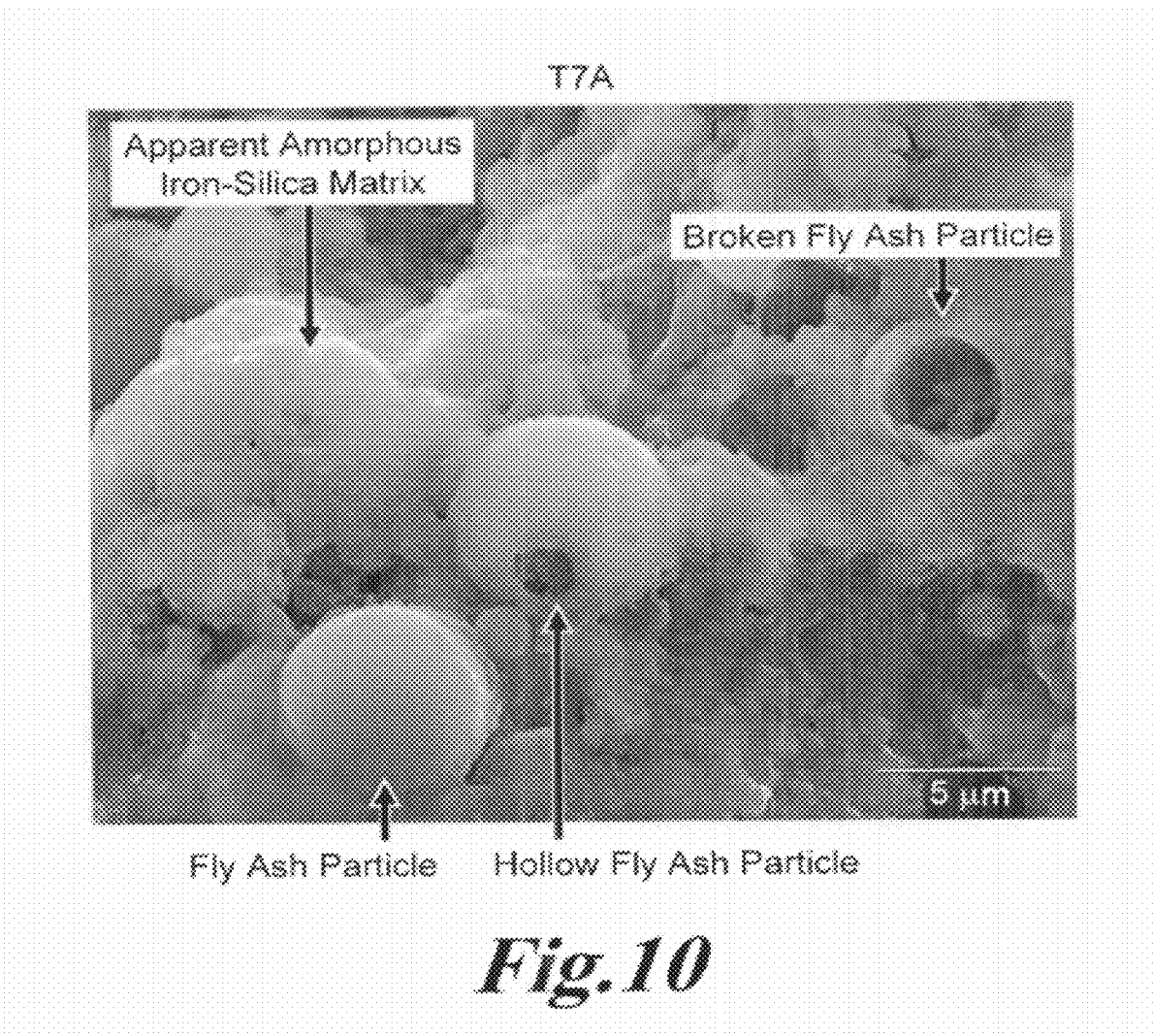
FIG. 10 shows an SEM characterization of a section of an oxidatively carbonated composition comprising fly ash particles.

POINT 3
Filter Fit Chi-squared value: 4.679
Correction Method: Proza (Phi-Rho-Z)
Acc. Voltage: 25.0 kV
Take Off Angle: 30.0 deg In FIG. 10, we see a much higher magnification (4000×) of the spherical fly ash particles themselves, which are composed mostly of silica (ranging from approximately 40% to 60%) with lesser amounts of alumina, $Al_2O_3$, (approximately 15 to 28%), and minor amounts of calcium, magnesium, and iron oxides. The spherical and often hollow fly ash particles are embedded within an amorphous iron-silica matrix that is a by-product of the formation of the more crystalline iron carbonate precipitate.

Figure 11A:
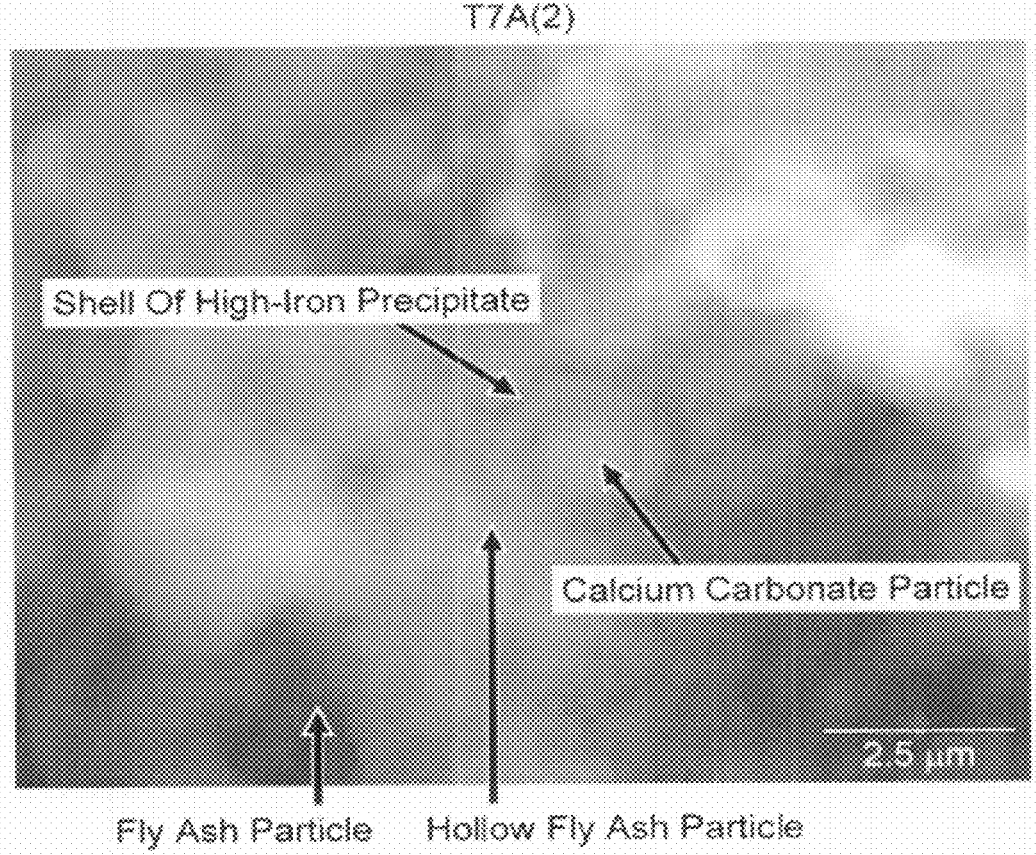
FIG. 11a shows an SEM characterization of a section of an oxidatively carbonated composition comprising a calcium carbonate particle and a high iron precipitate.
Figure 11B:
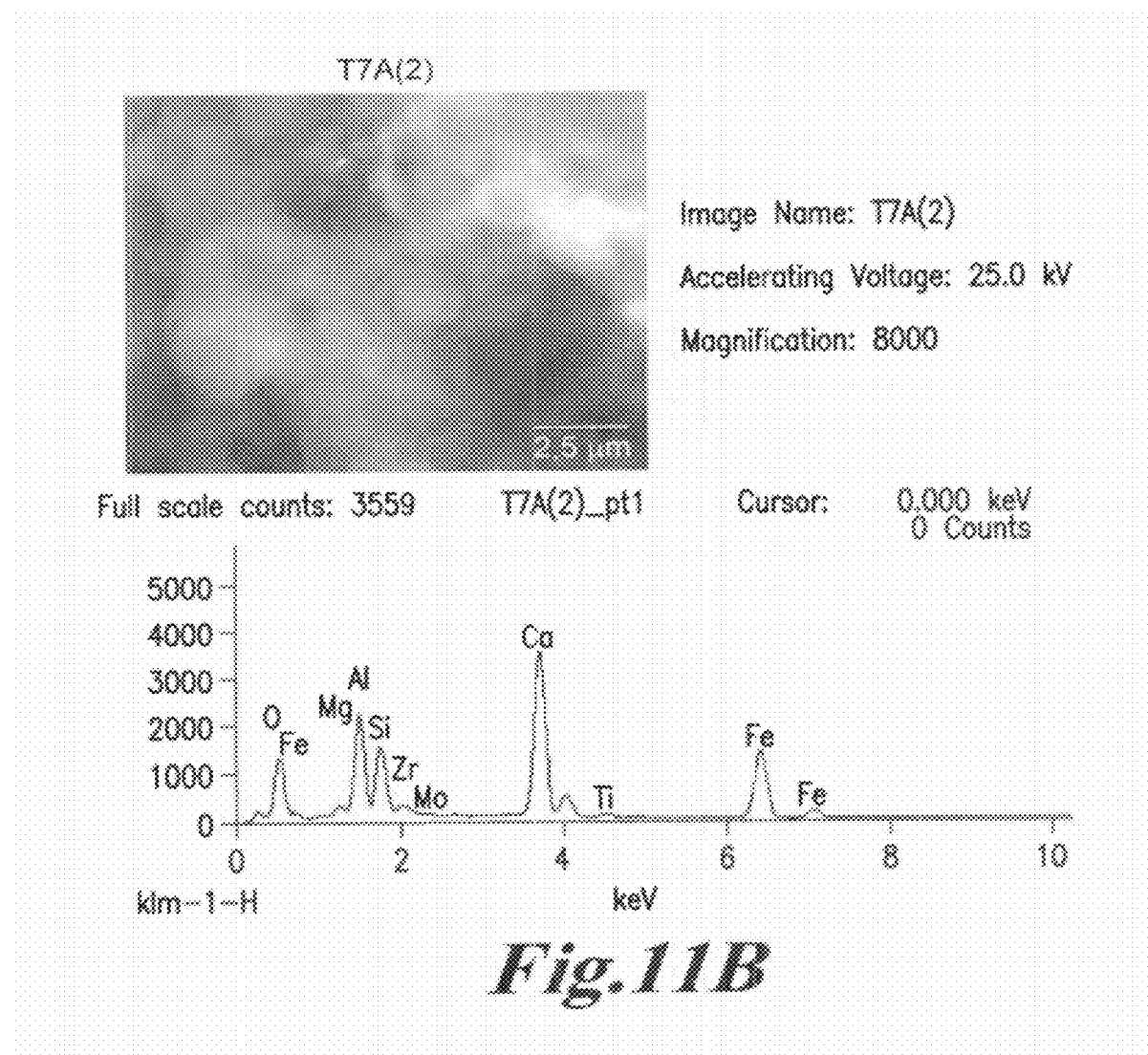
FIG. 11b shows an EDS characterization of a section of an oxidatively carbonated composition comprising a calcium carbonate particle and a high iron precipitate.

In FIG. 11a, also at the same high magnification of 4000×, the precipitation of iron around particles of calcium carbonate is revealed. Calcium carbonate is one of the possible carbonate minerals that, when finely ground, acts as a catalyst for the precipitation of iron carbonate. In FIG. 11b, the EDS analysis shows the reverse gradients of calcium and iron concentration from the center of the calcium carbonate particle out into the surrounding aggregate. That is, the calcium concentration decreases over this distance while the iron concentration increases. The formation of iron carbonate most readily occurs where it has a crystalline template already pre-existing as on the surface of the solid calcium carbonate particle.

TABLE 8

Figure 11B:
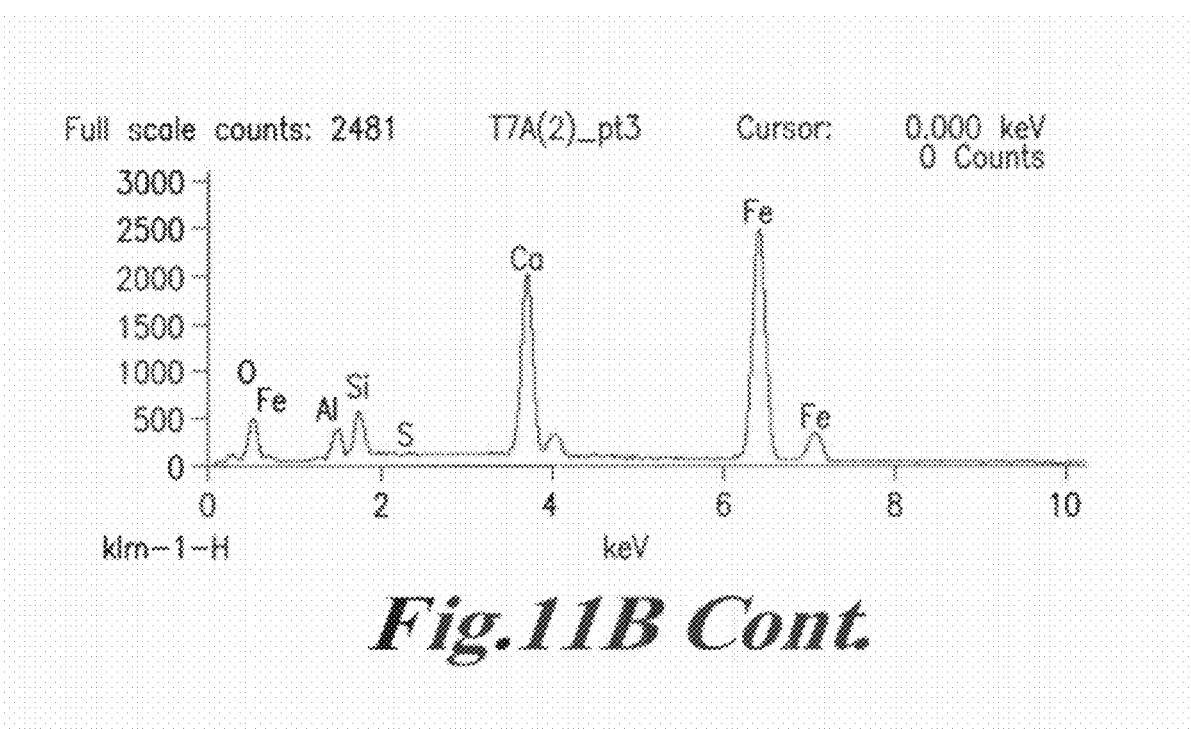

Quantitative Elemental Analysis for Point 1 of FIG. 11 (b):

| Element Line | Net Counts | Element Wt. % | Wt. % Error | Compnd Formula | Compnd Wt. % |
|---|---|---|---|---|---|
| O K | 14307 | 55.59 | +/−0.74 | O | 55.59 |
| Mg K | 1340 | 0.74 | +/−0.05 | Mg | 0.74 |
| Al K | 23544 | 9.32 | +/−0.13 | Al | 9.32 |
| Si K | 16101 | 5.38 | +/−0.11 | Si | 5.38 |
| Ca L | 0 | — | — | — | — |
| Ca K | 55408 | 14.89 | +/−0.11 | Ca | 14.89 |
| Ti L | 0 | — | — | — | — |
| Ti K | 1061 | 0.39 | +/−0.05 | Ti | 0.39 |
| Fe K | 26668 | 12.22 | +/−0.15 | Fe | 12.22 |
| Fe L | 1321 | — | — | — | — |
| Zr L | 2723 | 1.09 | +/−0.07 | Zr | 1.09 |
| Zr K | 0 | — | — | — | — |
| Zr M | 0 | — | — | — | — |
| Mo L | 914 | 0.39 | +/−0.06 | Mo | 0.39 |
| Mo M | 332 | — | — | — | — |
| Mo K | 0 | — | — | — | — |
| Total | | 100 | | | 100 |

POINT 1
Filter Fit Chi-squared value: 11.279
Correction Method: Proza (Phi-Rho-Z)
Acc. Voltage: 25.0 kV
Take Off Angle: 30.0 deg

TABLE 9

Quantitative Elemental Analysis for Point 2 of FIG. 11 (b):

| Element Line | Net Counts | Element Wt. % | Wt. % Error | Compnd Formula | Compnd Wt. % |
|---|---|---|---|---|---|
| O K | 8142 | 45.95 | +/−0.85 | O | 45.95 |
| Al K | 5787 | 3.94 | +/−0.12 | Al | 3.94 |
| Si K | 5740 | 2.89 | +/−0.12 | Si | 2.89 |
| S K | 680 | 0.31 | +/−0.04 | S | 0.31 |
| S L | 0 | — | — | — | — |
| Ca K | 42931 | 16.39 | +/−0.14 | Ca | 16.39 |
| Ca L | 0 | — | — | — | — |
| Fe L | 1786 | — | — | — | — |
| Fe K | 44350 | 29.08 | +/−0.26 | Fe | 29.08 |
| Zr M | 29 | — | — | — | — |
| Zr L | 2547 | 1.45 | +/−0.16 | Zr | 1.45 |
| Zr K | 0 | — | — | — | — |
| Total | | 100 | | | 100 |

POINT 2
Filter Fit Chi-squared value: 11.152
Correction Method: Proza (Phi-Rho-Z)
Acc. Voltage: 25.0 kV
Take Off Angle: 30.0 deg

TABLE 10

Quantitative Elemental Analysis for Point 3 of FIG. 11 (b):

| Element Line | Net Counts | Element Wt. % | Wt. % Error | Compnd Formula | Compnd Wt. % |
|---|---|---|---|---|---|
| O K | 4877 | 35.99 | +/−0.85 | O | 35.99 |
| Al K | 3432 | 3.38 | +/−0.14 | Al | 3.38 |
| Si K | 5818 | 4.15 | +/−0.13 | Si | 4.15 |
| S K | 317 | 0.2 | +/−0.04 | S | 0.2 |
| S L | 0 | — | — | — | — |
| Ca K | 30840 | 15.69 | +/−0.16 | Ca | 15.69 |
| Ca L | 0 | — | — | — | — |
| Fe L | 831 | — | — | — | — |
| Fe K | 46627 | 40.59 | +/−0.35 | Fe | 40.59 |
| Total | | 100 | | | 100 |

Figure 12A:
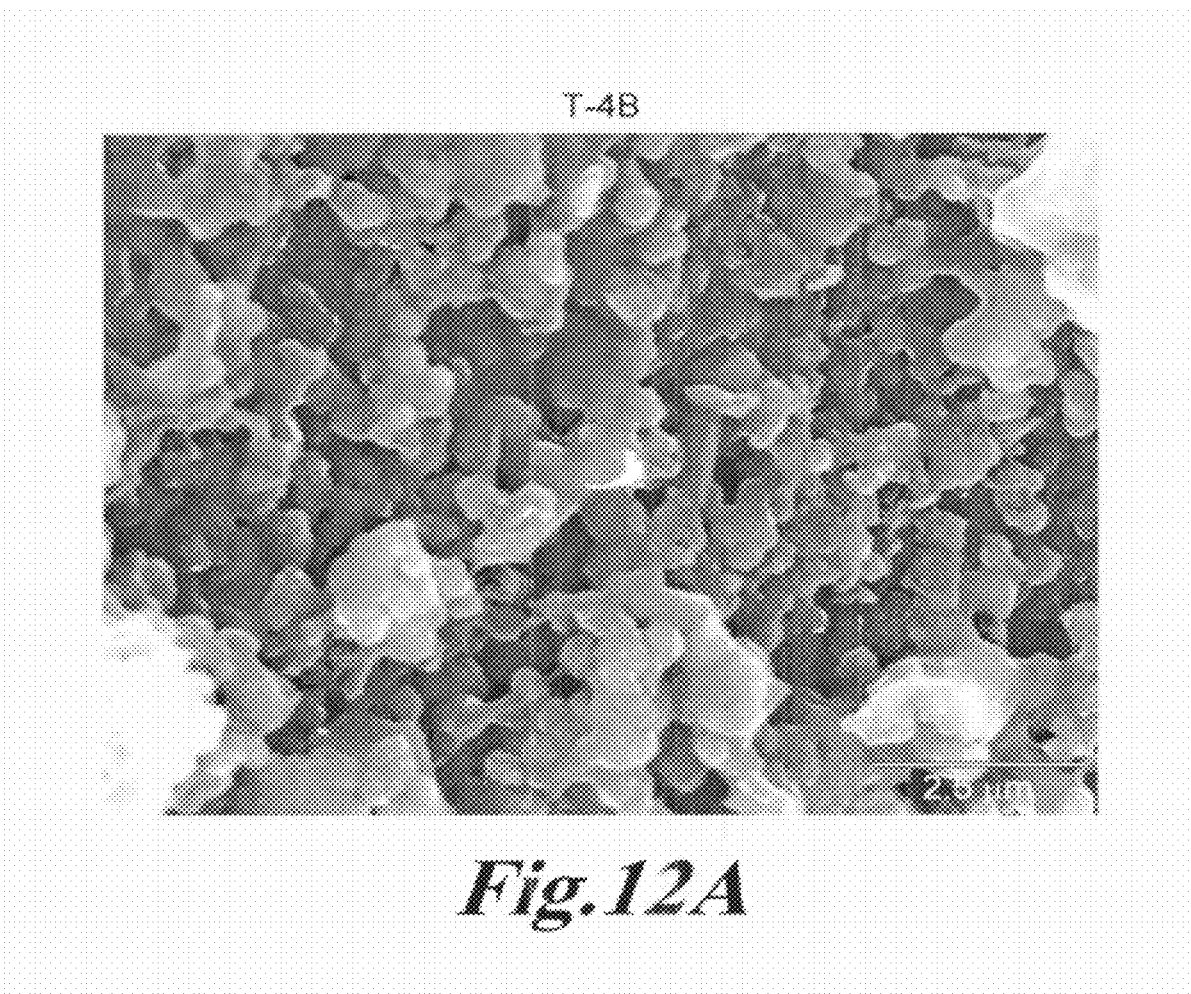
FIG. 12a shows a SEM characterization of a tung oil coated oxidatively carbonated composition, at very high magnification, containing iron carbonate crystals, iron silicate layers, and an iron-containing organic polymer derived from the tung oil.

POINT 3
Filter Fit Chi-squared value: 5.883
Correction Method: Proza (Phi-Rho-Z)
Acc. Voltage: 25.0 kV
Take Off Angle: 30.0 deg FIG. 12a shows an image of the composite cemented material at high magnification, 10,000×, FIG. 12a shows the combination of somewhat crystalline structure (angular shapes) within an amorphous appearing matrix (smoother, flowing forms). This material includes iron carbonate crystals, iron silicate layers, and an iron-containing organic polymer derived from tung oil, which coats the surface of the minerals. The composite nature of the cured product is evident and specifically its mineral-organic hybrid composite nature. Conspicuous by their absence are the metallic iron particles, which in most cases are hidden within the mineral-organic layer that has formed around them. FIG. 12a is of a roughly fractured, broken surface. The metallic iron particles are evident when fragments have been ground and polished as shown in FIGS. 7a, 8a, and 9a. An abrasive method of sample preparation physically removes the hard shell of iron carbonate crystalline minerals, amorphous iron silicate minerals, and iron-rich polymers that has formed around the metallic iron particles.

Figure 12B:
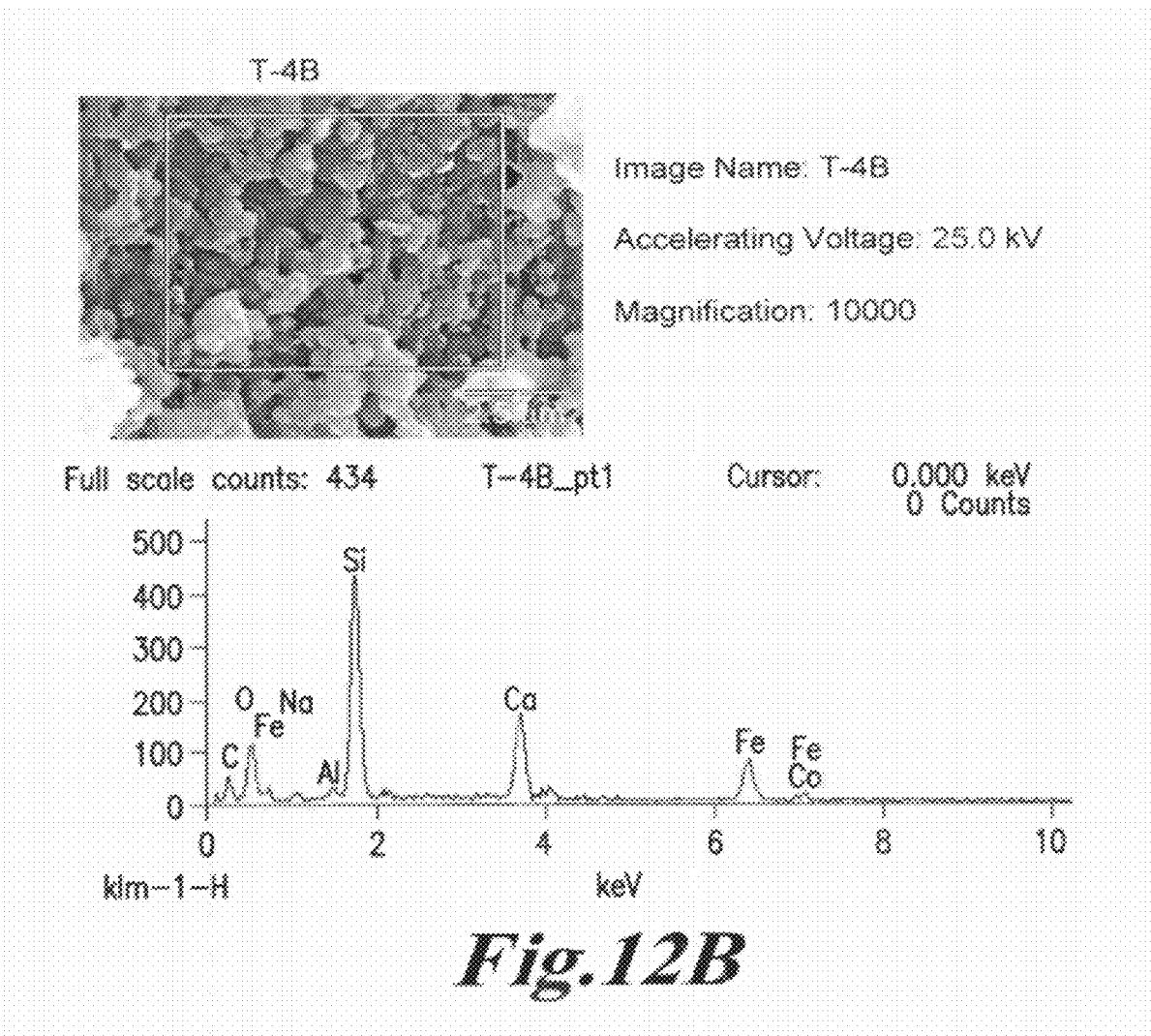

FIG. 12b shows the EDS scan of a large area (within the box). The EDS shows that the material is dominated by silicon (as silica in the form of the fly ash). The fine aggregate of silica-rich fly ash particles make up the bulk of the material surrounding the metallic iron particles. The fly ash was mixed with the metallic iron particles in the preparation of the dry curable composition and thus were physically present from the beginning. The elemental iron and carbon diffuses into this aggregate and chemically precipitates as iron carbonate. The carbon source is $CO_2$ gas present during the curing process. The iron comes from the dissolution of the surfaces of the metallic iron particles. The precipitated matrix is therefore present within the interstitial space around the fly ash particles. The tightly packed fly ash particles are not forced apart in this process and so the space available is a minor fraction of the total. Even smaller particles such as clay and powdered calcium carbonate further reduce the available space.

TABLE 11

Quantitative Elemental Analysis for Point 1 of FIG. 12 (b):

| Element | ZAF | Element Wt. % | Wt. % Error | Atom % |
|---|---|---|---|---|
| C | 5.077 | 18.88 | +/−1.69 | 27.72 |
| O | 5.287 | 51.2 | +/−2.29 | 56.44 |
| Na | 4.811 | 1.95 | +/−0.27 | 1.49 |
| Al | 2.284 | 0.55 | +/−0.09 | 0.36 |
| Si | 1.737 | 14.61 | +/−0.25 | 9.18 |
| Ca | 1.158 | 6.2 | +/−0.23 | 2.73 |
| Fe | 1.216 | 6.61 | +/−0.40 | 2.09 |
| Total | | 100 | | 100 |

Point 1 (box-average of area)
Filter Fit Chi-squared value: 1.550
Correction Method: Proza (Phi-Rho-Z)
Acc. Voltage: 25.0 kV
Take Off Angle: 30.0 deg Example 1

Table 12 demonstrates the relative inertness of iron powder, coated with silica, to water and air (entry 4); and the reactivity of the iron powder, coated with silica, to carbon dioxide in the presence of water (entry five). In all of the experiments in Table 12, iron powder was mixed with the ingredients shown for each numbered entry in Table 12, and the results of any reaction resulting from the mixing of ingredients was recorded.

TABLE 12

| Entry | Form of Iron | Form of Silica | Other Components | Observations |
|---|---|---|---|---|
| 1 | <5um (particle size) Metallic Iron Powder | None | Water, Air | Turns green, then black. (Strongly Cemented). |
| 2 | <5um (particle size) Metallic Iron Powder | None | Water, Air, Carbon Dioxide | Turns green, then tan (Strongly Cemented). |
| 3 | <5um (particle size) Metallic Iron Powder | None | Water, Air, $NH_3$ | Turns black (Strongly Cemented). |
| 4 | <5um (particle size) Metallic Iron Powder | Ground Glass (~1-50 μm) | Water, Air, Hydrogen Peroxide | No Cementation. No Iron Oxidation. |
| 5 | <5um (particle size) Metallic Iron Powder | Ground Glass (~1-50 μm) | Water, Carbon Dioxide (gas) | Turns green, then brown. Becomes Very Hard. |
| 6 | <5um (particle size) Metallic Iron Powder | Silica Fume 7 nm | Water, Air | Turns Reddish Brown. Becomes Very Hard. |
| 7 | <5um (particle size) Metallic Iron Powder | Silica Fume 7 nm | Water, Air, $NH_3$ | Delayed Reaction. Turns Brown and Darkens. Becomes Very Hard |
| 8 | <5um (particle size) Metallic Iron Powder | Silica Fume 7 nm | Water, Air, Carbon Dioxide | Fast, Intense Reaction. Becomes Very Hard |

TABLE 12-continued

| Entry | Form of Iron | Form of Silica | Other Components | Observations |
|---|---|---|---|---|
| 9 | <5um (particle size) Metallic Iron Powder | Sodium Silicate Solution ~27% SiO$_2$ | None | Strong Cementation. Turns Grey. |
| 10 | <5um (particle size) Metallic Iron Powder and Goethite (FeOOH); 1:3 | Silica Fume 7 nm | Water, Air, Carbon Dioxide | Weak Cementation. Evolution of Hydrogen Causing Expansion and Porosity of Material. |

Example 2

Cured Composition Formation

Dry Ingredients and Amounts (and Preferred Ranges)

| | | |
|---|---|---|
| Fly Ash | 40% | (15-50%) |
| Iron Powder | 35% | (25-60%) |
| Siderite | 10% | (5-15%) |
| Kaolinite | 8% | (0-15%) |
| Magnetite | 6% | (0-8%) |
| Oxalic Acid | 1% | (0-1.5%) |

Liquid Ingredients

Water [salt content of 0-5%]
Pure Tung Oil
Mineral Spirits

Procedure for Cured Composition Formation

1) The dry ingredients were ground together with a ball mill until a uniform color was produced, over the course of several minutes. For grinding, each ingredient was added separately in the following order: iron powder, oxalic acid, magnetite, siderite, kaolinite, and fly ash.

2) Water was added, all at once, and mixed quickly forming a paste. The paste was allowed to set for at least 10 minutes.

3) The paste was placed in a mold to form a shaped paste.

4) The shaped paste was put into a chamber and the chamber was first purged with carbon dioxide, and then filled with carbon dioxide. The concentration of carbon dioxide in the chamber was maintained at a high concentration (about 100%) while oxidative carbonation was occurring, by maintaining a slight, positive flow of carbon dioxide.

During oxidative carbonation, the paste was kept moist by spraying with water where the surface of the paste appeared to have dried.

The paste was oxidatively carbonated for 7 days, thus forming the carbonate oxidized composition, which was then removed from the mold.

Once the molded carbonate oxidized composition was dry, the dried carbonate oxidized composition was saturated with a tang oil/mineral spirit mix to seal the carbonate oxidized composition.

Example 3

Over 200 cylindrical samples of an oxidatively carbonated composition were prepared. The cylindrical samples were each 1 inch in diameter and 1 inch in height. The samples were prepared for testing for compressive strength using method ASTM-C 579-01, which is incorporated by reference, herein, in its entirety. To prepare the samples, different wet pastes comprising different weight to weight ratios of an iron powder to a silica powder, and optionally other ingredients, were each placed in at least two increments into a section of acrylic rod 1" in height and having 1" inside diameter and tamped down with a solid acrylic rod to remove air pockets. The tamped down pastes were then exposed to an oxygenated carbon, and allowed to oxidatively carbonate to form cylindrical samples of oxidatively carbonated composition. The compressive strength of each of the samples was determined using a commercial material testing machine designed for this purpose. It generates a stress-strain plot indicating the relationship between the displacement of the sample as the pressure upon it increases. The compressive strength at failure varies with the amount and type of iron particle used (including characteristics such as size, shape, density, porosity, purity, and others), the amount and type of silica used, the amount and type of aggregate used if any (sand, crushed glass, fibers, etc.), the length of cure, the temperature during the curing process, the application of a magnetic field if any, the use of promoters such as oxalic acid, the type and amount of catalyst used such as calcium carbonate, and the type of stabilizer used, if any. Compressive strengths of over 10,000 psi have been attained. However, the average compressive strength is in the range of 2,500 to 6,000 psi. Preferably the compressive strength of the cement of the invention is 2000 psi or greater, more preferably 2500 psi or greater, more preferably 3000 psi or greater, more preferably 3500 psi or greater, more preferably 4000 psi or greater, more preferably 4500 psi or greater, more preferably 5000 psi or greater, more preferably 6000 psi or greater, more preferably 7000 psi or greater, more preferably 8000 psi or greater, more preferably 9000 psi or greater, more preferably 10,000 psi or greater.

The above written description of the invention provides a manner and process of making and using it such that any person skilled in this art is enabled to make and use the same, this enablement being provided in particular for the subject matter of the appended claims, which make up a part of the original description of the invention.

As used above, the phrases "selected from the group consisting of," "chosen from," and the like include mixtures of specified materials.

All references, patents, applications, tests, standards, documents, publications, brochures, texts, articles, etc. mentioned herein are incorporated herein by reference. Where a numerical range or limit is stated, the endpoints are included. Also, all values and subranges within a numerical limit or range are specifically included as if explicitly written out. Terms such as "contain(s)" and the like as used herein are open terms meaning 'including at least' unless otherwise specifically noted.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

I claim:

1. A oxidatively carbonatable composition comprising:
   siderite,
   a powdered iron having an average particle size of about ≦250 μm and present in an amount of from 10 to 90% by weight, and
   a powdered silica, having an average particle size of about ≦250 μm and present in an amount of from 10 to 90% by weight,
   wherein % by weight is based on the total weight of the iron and the silica, and
   wherein the composition is capable of forming a cementitious iron carbonate matrix when oxidatively carbonated.

2. The composition of claim 1, further comprising at least one acid or a salt of the acid.

3. The composition of claim 2, wherein the acid, or salt thereof, is present in the composition in an amount of from >0 wt % to 1.5 wt %, based on the total weight of the composition.

4. The composition of claim 2, wherein the acid, or salt thereof, is at least one selected from the group consisting of oxalic acid, glycolic acid and formic acid.

5. The composition of claim 4, wherein the acid, or salt thereof, is oxalic acid.

6. The composition of claim 1, further comprising at least one clay.

7. The composition of claim 6, wherein the clay is present in the composition in an amount of from >0 wt % to 15 wt %, based on the total weight of the composition.

8. The composition of claim 1, further comprising at least one member selected from the group consisting of kaolinite, nacrite, halloysite, muscovite and biotite.

9. The composition of claim 1, further comprising at least one carbonate.

10. The composition of claim 9, wherein the carbonate is present in the composition in an amount of from >0 wt % to 15%, based on the total weight of the composition.

11. The composition of claim 9, wherein the carbonate is at least one selected from the group consisting of calcium carbonate, iron carbonate, calcium-iron carbonate, and calcium magnesium carbonate.

12. The composition of claim 1, wherein the siderite is present in the composition in an amount of from >0 wt % to 15 wt %, based on the total weight of the composition.

13. The composition of claim 1, further comprising at least one acid, or salt thereof, and at least one clay.

14. The composition of claim 1, further comprising at least one material selected from the group consisting of at least one acid or salt thereof, at least one clay, at least one carbonate, and siderite.

15. The composition of claim 1, further comprising at least one material selected from the group consisting of at least one acid or a salt thereof, at least one carbonate, siderate, kaolinite, nacrite, halloysite, muscovite and biotite.

16. The composition of claim 1, wherein the powdered silica coats the powdered iron such that about 100% of the powdered iron does not chemically react when the composition is exposed to air and water.

17. The composition of claim 1, wherein at least one material selected from the group consisting of fly ash, recycled glass, diatomaceous earth, quartz, chalcedony, chert, and jasper is ground to form the powdered silica.

18. The composition of claim 1, wherein at least one material selected from the group consisting of iron, steel, iron grit, steel grit, spent steel abrasive, steel scrap, and steel machine shop waste is ground to produce the powdered iron.

19. The composition of claim 1, wherein the powdered iron is present in an amount of from 60 to 80% by weight and wherein the powdered silica is present in an amount of from 20 to 40% by weight.

20. The composition of claim 1, wherein the composition further comprises at least one of a solid diluent and an aggregate.

21. The composition of claim 1, wherein the cementitious iron carbonate matrix is a continuous siderite matrix.

22. An oxidatively carbonated composition, comprising:
   silica and mixed particles comprising $Fe^0$ and iron carbonate,
   wherein the mixed particles each comprise a core and a periphery,
   wherein the core comprises $Fe^0$,
   wherein the periphery comprises iron carbonate, and
   wherein the peripheries of the mixed particles contact, interpenetrate, or contract and interpenetrate each other to form an interbonded matrix of mixed particles.

23. The oxidatively carbonated composition of claim 22, further comprising particles comprising $Fe^0$, wherein the particles comprising $Fe^0$ do not comprise iron carbonate.

24. The oxidatively carbonated composition of claim 22, wherein the interbonded matrix is a crystalline interbonded matrix.

25. The oxidatively carbonated composition of claim 22, further comprising particles comprising $Fe^0$, wherein the particles comprising $Fe^0$ do not comprise iron carbonate, wherein the interbonded matrix is a crystalline interbonded matrix.

26. A composition, comprising:
   an oxidatively carbonated mixture of (i) a powdered iron having an average particle size of about ≦250 μm and present in the mixture in an amount of from 10 to 90% by weight, and (ii) a powdered silica having an average particle size of about ≦250 μm and present in the mixture in an amount of from 10 to 90% by weight, wherein % by weight is based on the total weight of the iron and the silica,
   wherein the composition has an interbonded matrix including silica, $Fe^0$, and iron carbonate,
   wherein at least a portion of the $Fe^0$ is in the form of particles and at least a portion of the iron carbonate is present on the periphery of the $Fe^0$ particles,
   wherein the iron carbonate peripheries contact, interpenetrate, or contact and interpenetrate each other to form the interbonded matrix, and
   wherein a cylinder of the composition having a height of 1 inch and a diameter of 1 inch has a compressive strength of ≧2,000 psi when prepared according to ASTM-C 579-01.

27. The oxidatively carbonated composition of claim 26, wherein the precursor composition further comprises oxalic acid.

28. An oxidatively carbonated composition, comprising: silica, $Fe^0$, and iron carbonate,
wherein at least a portion of the $Fe^0$ is in the form of particles and at least a portion of the iron carbonate is present at the peripheries of the $Fe^0$ particles and the iron carbonate extends from at least one $Fe^0$ particle to a different $Fe^0$ particle, and
wherein at least a portion of the iron carbonate peripheries of the $Fe^0$ particles contact, interpenetrate, or both contact and interpenetrate each other to form an interbonded matrix.

* * * * *